US009311020B2

(12) United States Patent
Reohr et al.

(10) Patent No.: US 9,311,020 B2
(45) Date of Patent: *Apr. 12, 2016

(54) METHOD AND APPARATUS FOR AUTOMATED MIGRATION OF DATA AMONG STORAGE CENTERS

(71) Applicant: International Business Machines Corporation, Armonk, NY (US)

(72) Inventors: William R. Reohr, Ridgefield, CT (US); Birgit M. Pfitzmann, Wettswil (CH); Kevin M. Kingsbury, Bastrop, TX (US); Laura A. Richardson, Ridge Manor, FL (US); Peter Urbanetz, Wadenswil (CH); William B. Yoes, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 112 days.

This patent is subject to a terminal disclaimer.

(21) Appl. No.: 13/970,357

(22) Filed: Aug. 19, 2013

(65) Prior Publication Data

US 2014/0173232 A1 Jun. 19, 2014

Related U.S. Application Data

(63) Continuation of application No. 13/717,216, filed on Dec. 17, 2012.

(51) Int. Cl.
*G06F 12/00* (2006.01)
*G06F 3/06* (2006.01)
*H04L 29/08* (2006.01)

(52) U.S. Cl.
CPC .............. *G06F 3/067* (2013.01); *G06F 3/0611* (2013.01); *G06F 3/0647* (2013.01); *H04L 67/1097* (2013.01); *H04L 67/2852* (2013.01)

(58) Field of Classification Search
CPC ..... G06F 3/067; G06F 3/0611; G06F 3/0647; H04L 67/1097; H04L 67/2852
USPC ........................................................ 711/162
See application file for complete search history.

(56) References Cited

U.S. PATENT DOCUMENTS 5,822,780 A 10/1998 Schutzman
8,112,605 B2 2/2012 Kavuri (Continued)

OTHER PUBLICATIONS

Form PTO-982 from parent U.S. Appl. No. 13/717,216, Jan. 13, 2015.

*Primary Examiner* — Kalpit Parikh
(74) *Attorney, Agent, or Firm* — Louis J. Percello, Esq.; Otterstedt, Ellenbogen & Kammer, LLP

(57) ABSTRACT

A method for controlling the storage of data among multiple regional storage centers coupled through a network in a global storage system is provided. The method includes steps of: defining at least one dataset comprising at least a subset of the data stored in the global storage system; defining at least one ruleset for determining where to store the dataset; obtaining information regarding a demand for the dataset through one or more data requesting entities operating in the global storage system; and determining, as a function of the ruleset, information regarding a location for storing the dataset among regional storage centers having available resources that reduces the total distance traversed by the dataset in serving at least a given one of the data requesting entities and/or reduces the latency of delivery of the dataset to the given one of the data requesting entities.

10 Claims, 17 Drawing Sheets

(56) References Cited

U.S. PATENT DOCUMENTS

| | | | |
|---|---|---|---|
| 2002/0078167 A1* | 6/2002 | Shavit | H04W 8/02 709/217 |
| 2003/0046270 A1* | 3/2003 | Leung et al. | 707/1 |
| 2006/0218367 A1 | 9/2006 | Ukai et al. | |
| 2008/0071859 A1 | 3/2008 | Seed et al. | |
| 2010/0076933 A1* | 3/2010 | Hamilton | G06F 3/0604 707/640 |
| 2010/0205541 A1 | 8/2010 | Rapaport et al. | |
| 2012/0023223 A1 | 1/2012 | Branch et al. | |
| 2013/0198476 A1* | 8/2013 | Nakajima et al. | 711/165 |

\* cited by examiner

METHOD AND APPARATUS FOR AUTOMATED MIGRATION OF DATA AMONG STORAGE CENTERS

CROSS-REFERENCE TO RELATED APPLICATIONS

The present application is a continuation of U.S. patent application Ser. No. 13/717,216, filed on Dec. 17, 2012, the contents of which are expressly incorporated herein by reference in its entirety for all purposes.

BACKGROUND

The present invention relates generally to the electrical, electronic, and computer arts, and more particularly relates to data storage and distribution.

With the prolific use of networking and cloud computing, data or other content is no longer restricted to residing on local storage devices. Rather, a modern trend, particularly for data that is shared among multiple users, is to utilize a large distributed system of servers, often referred to as a content delivery network (CDN), deployed in multiple data centers worldwide through the Internet for supplying content to end-users in an efficient manner. CDNs supply a large fraction of the Internet content available today, including web objects (e.g., text, graphics, URLs and scripts), downloadable objects (e.g., media files, software, documents), applications (e.g., e-commerce, portals), live streaming media, on-demand streaming media, social networks, etc. In order to provide such content with high availability and high performance, physical data often needs to be duplicated within the network.

Replication of some data for the purpose of efficient distribution is presently being handled by proxy caches embedded within the Internet. A proxy cache will distribute, for example, video content to a selected region. In such a scenario, multiple copies of the same read-only data (e.g., video data) are located within proxy caches scattered throughout the world. Each proxy cache distributes requested data to its regional customers, thereby reducing network traffic congestion, latency and power consumption. However, while it is generally straightforward to propagate copies of read-only data through various proxy caches around the world, the same is not true for read/write data.

BRIEF SUMMARY

Embodiments of the present invention provide a means for advantageously reducing network traffic congestion, power consumption and/or cost of data storage, management and delivery in a cloud computing environment.

In accordance with an embodiment of the invention, a method for controlling the storage of data among multiple regional storage centers coupled through a network in a global storage system is provided. The method includes the steps of: defining at least one dataset comprising at least a subset of the data stored in the global storage system; defining at least one ruleset for determining where to store the dataset; obtaining information regarding a demand for the dataset through one or more data requesting entities operating in the global storage system; and determining, as a function of the ruleset, information regarding a location for storing the dataset among regional storage centers having available resources that reduces the total distance traversed by the dataset in serving at least a given one of the data requesting entities and/or reduces the latency of delivery of the dataset to the given one of the data requesting entities.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein.

Figure 1:
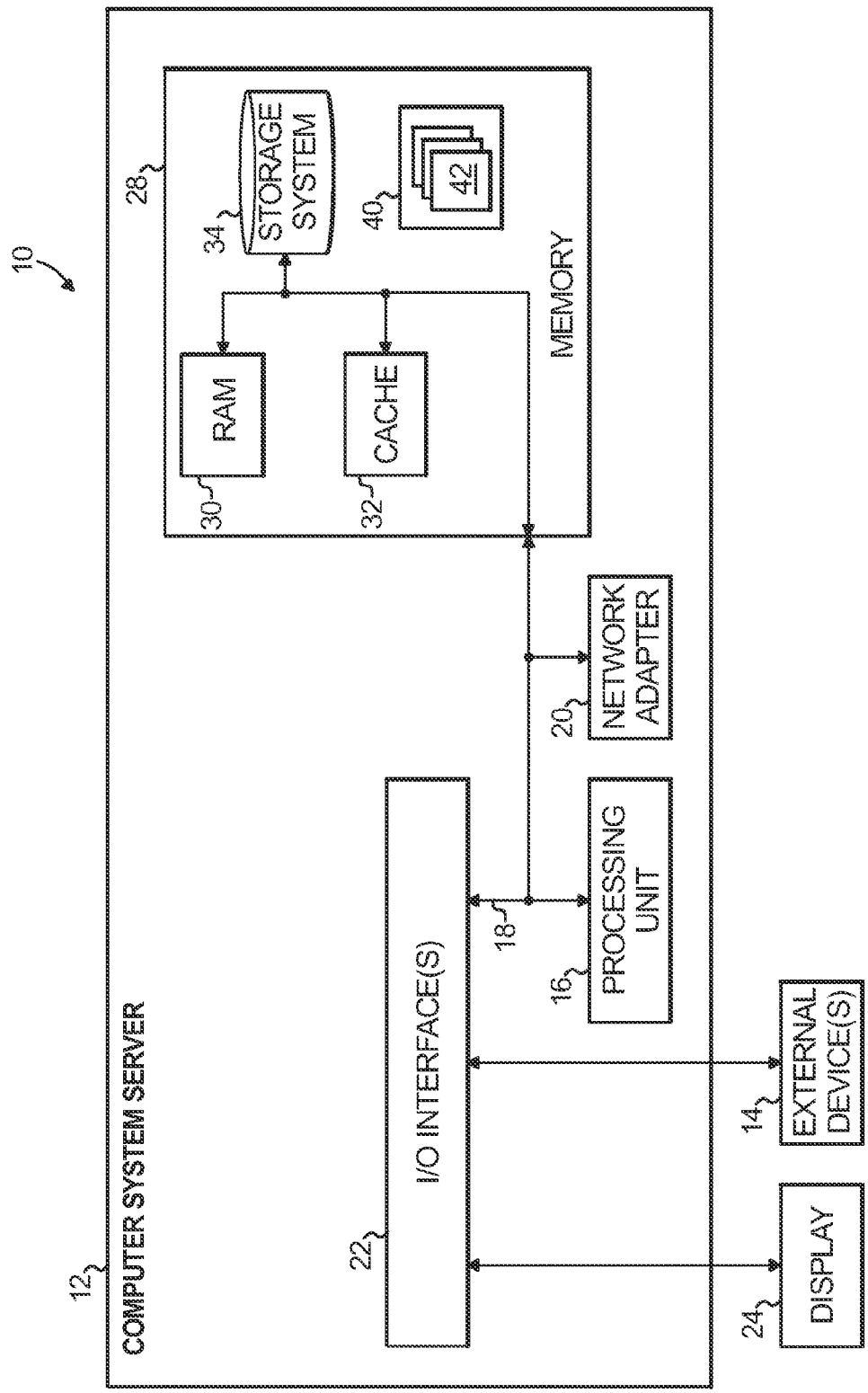
FIG. 1 depicts a cloud computing node according to an embodiment of the present invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Aspects of the present invention will be described herein in the context of an illustrative mechanism to facilitate the management and/or distribution of read/write data across multiple data storage centers in a content storage, management and delivery network. It is to be appreciated, however, that the invention is not limited to the specific apparatus and/or methods illustratively shown and described herein. Nor is the invention necessarily limited to the types of applications that can derive a benefit from embodiments of the invention. Rather, embodiments of the invention are directed more broadly to techniques for reducing network traffic congestion, power consumption and/or cost of data storage, management and delivery in a cloud computing environment. Moreover, it will become apparent to those skilled in the art given the teachings herein that numerous modifications can be made to the embodiments shown that are within the scope of the present invention. That is, no limitations with respect to the specific embodiments described herein are intended or should be inferred.

As a preliminary matter, definitions of certain terms used throughout the detailed description will be provided. Specifically, the term "dataset" as used herein is intended to refer broadly to a collection of data that is managed throughout its life cycle as a unit and may be migrated from one storage center to another as a unit. A plurality of files, objects and/or other technical storage units may be incorporated into one dataset. Likewise, a single file may be distributed across multiple datasets. Examples of a dataset include, but are not limited to, a single file, a collection of files, a portion of a file(s), a database, a logical volume(s), a volume group(s), a virtual machine, etc. The term "distance" as used herein is intended to refer broadly to network distance rather than geographical distance.

Network distance between two locations may, for example, also be interpreted as one or more of the following: distance in kilometers along the shortest physical network lines between the two locations; an inverse of maximum bandwidth of the network between the two locations (i.e., if no other traffic is present), or of average bandwidth given typical (i.e., nominal or observed) other data traffic; turnaround time of data packets transferred between the two locations, i.e., time from sending a data packet from one location, over its arrival at the other location, to the arrival of a receipt for the data packet at the first location (again as best-case with no other traffic present, or average); network cost between the two locations (e.g., cost per megabyte (MB)); latency (best-case or average one-way time for network-traffic between the 2 locations); power consumption by the network between the two locations, e.g., per megabyte sent; or a combination (which may be weighted) of one or more of the above, among other definitions. Among these notions of network distance, power used by the network might often not be known to the storage providers, and cost might be used instead, where the network provider typically factors in power costs. Thus, the concept of reducing (e.g., minimizing) network distance, in the context of a data storage system, is intended to refer broadly to optimizing one or more network-related characteristics of the storage system, not merely minimizing a geographical distance between two points.

Embodiments of the present invention are well-suited for use in a cloud computing infrastructure. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of the cloud model are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
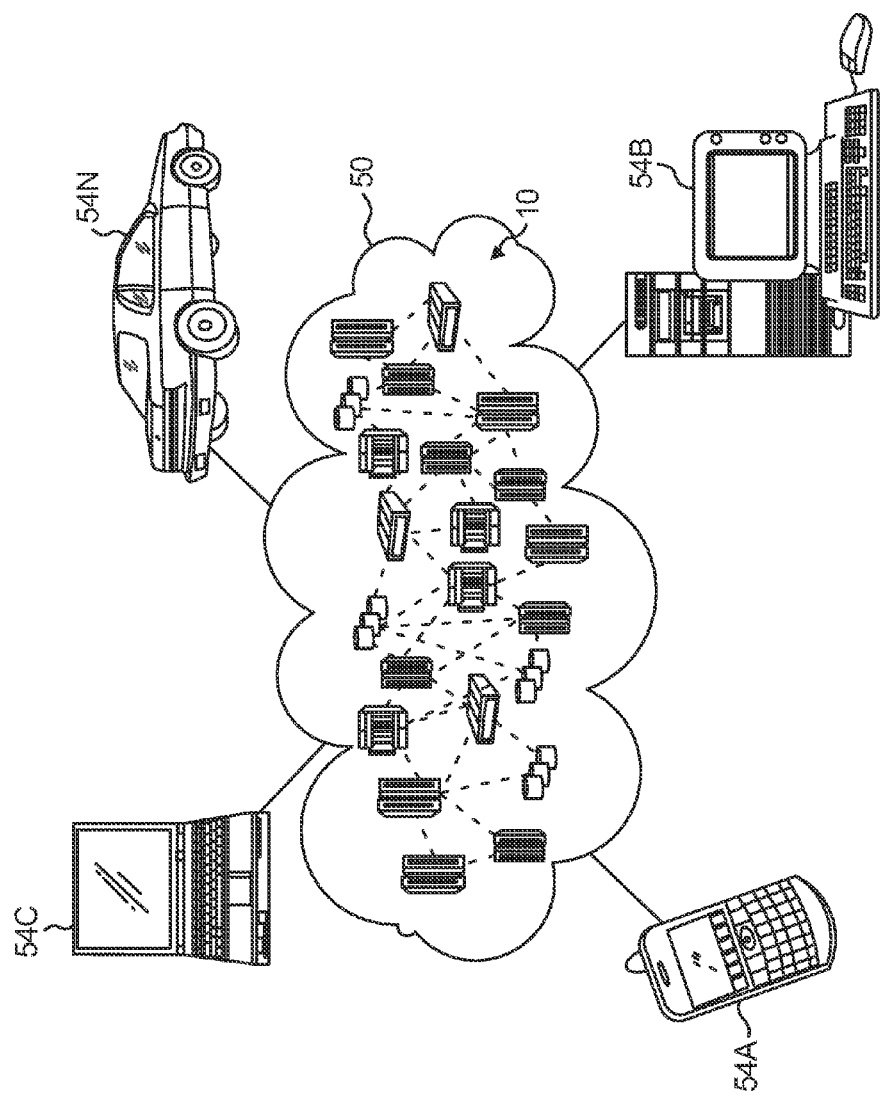
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is to be understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
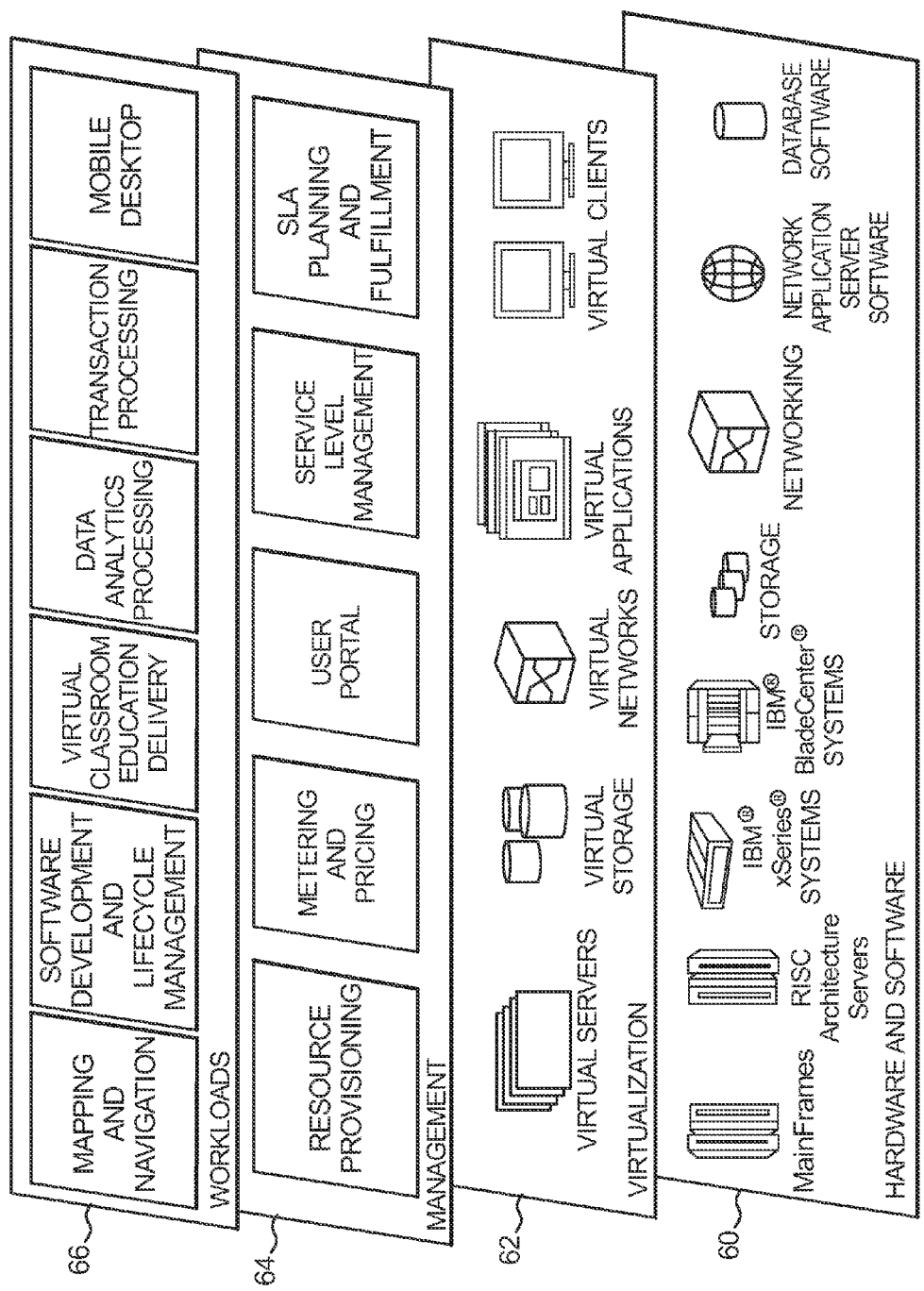
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

To reduce network traffic in a computing system, it would be desirable to assemble different (e.g., regional) storage centers into a global storage cloud (or system), which can be internal to one enterprise, or to all cloud components offered by one public cloud provider, or to a multi-provider organization. The cost of data storage, management and delivery can be reduced by migrating selective data, over time, from one storage center to another within such a global storage system. The manner in which data is stored, delivered and/or managed among the different regional storage centers can be controlled, in accordance with embodiments of the invention, to advantageously optimize one or more characteristics of the global storage system (e.g., to reduce network traffic, cost, latency, power consumption, etc.)

Demand for datasets will fluctuate across regions when, for example, (i) new or old businesses grow their enterprises and spread them to locations across the globe, and when (ii) the popularity of a diva or cultural icon sweeps across regional populations. To illustrate scenario (ii) more clearly, consider, by way of example only, the following: first, the people of Philadelphia begin to patronize a local rock-n-roll band, months later people from London hear the new sound and become enthralled, and finally as the band attracts more international attention the people of Prague host a concert for this new band that has, in the meantime, become an international sensation. Along with the spreading popularity of the band is a spreading of demand for information about the band. In these situations, among others, each dataset should ideally migrate, in steps over time, for example, to locations at the center of gravity of the consumer demand (at each time interval). Thus, the term "center of gravity" as used herein in conjunction with data storage, management and delivery, for a given dataset is intended to refer broadly to the location of a storage center within a global storage system that minimizes a total distance traversed by the dataset in serving its anticipated end user(s).

More particularly, let a specific choice of a notion of network distance function $d(l_1, l_2)$ for any two locations $l_1$ and $l_2$ be defined. Further, let a dataset S at a location L, a time period T, and an anticipated or real usage pattern of dataset S in time period T be given. Such as usage pattern can, for example, be described in the form of a list or matrix $((l_1, a_1), (l_2, a_2), \ldots, (l_n, a_n))$, where $l_1, \ldots, l_n$ denote locations from where usage is done, and $a_1, \ldots, a_n$ denote the respective amounts of data (e.g., in megabytes (MB)) of data transfers. Then the primary definition of the total distance D traversed by dataset S in time period T can be determined as: $D = a_1 \cdot d(l_1, L) + \ldots + a_n \cdot d(l_n, L)$. When we have not yet fixed the location L of dataset S, then by the center of gravity for dataset S in time period T, given this usage pattern, we define the location L for which the value D is minimal. Typically, location L is unique, but theoretically there can also be more than one center of gravity. The location L may be restricted to locations where the overall storage system (e.g., cloud) has a storage center. Hence, a center of gravity can be defined as a location $L^*$ such that $a_1 \cdot d(l_1, L^*) + \ldots + a_n \cdot d(l_n, L^*) \leq a_1 \cdot d(l_1, L) + \ldots + a_n \cdot d(l_n, L)$ for every other possible location L.

The particular definition of network distance used will generally affect the type of network characteristic to be optimized. For example, if network distance is defined as pure distance or as cost, the above definition of center of gravity is meant literally as defined above. In this case, a goal is to minimize, or otherwise reduce, an overall distance or cost of data transfers, including that of a potential migration. In other words, if the dataset D resides at a location L' before the time period T for which a usage pattern is given or estimated, then it is not necessarily optimal to migrate the dataset D to its center of gravity $L^*$ for this period. Migration of the dataset itself may need to be considered. If the size of the dataset in megabytes (MB) is b, and the dataset resides at location L' (e.g., the location of the storage center before the migration), then we are looking for a location $L^{\wedge}$ such that $a_1 \cdot d(l_1, L^{\wedge}) + \ldots + a_n \cdot d(l_n, L^{\wedge}) + b \cdot d(L', L^{\wedge}) \leq a_1 \cdot d(l_1, L) + \ldots + a_n \cdot d(l_n, L) + b \cdot d(L', L)$ for every other possible location L (as previously defined). In some cases, a different measure of network distance may be used for the migration of the dataset itself, or none; for example, turnaround time or latency may not be considered important for the migration.

The computation of such data transfers, assuming one or more different demand scenarios, may include evaluation of caching. In this case, the center of gravity may instead be defined so as to minimize the generated traffic or cost, taking the caches into account. Thus, instead of minimizing the weighted sum of network distances to the location L of the data set, the size of a minimum spanning tree from the location L to all users is preferably computed, according to one embodiment, where the nodes in the graph from which the spanning tree is selected are possible caches, user locations, and the dataset location, and the edges of the graph are weighed with the products of their network distance and the amount of data that would flow over them given the usage pattern. Spanning tree analysis is a well-known technique, and therefore the details of the spanning tree analysis will not be presented herein.

If network distance is defined as turnaround time, then instead of adding the turnaround times, an objective may be to minimize the maximum turnaround time over all users. Hence for this case, an alternative definition of center of gravity is a location $L^*$ such that $\max(a_1 \cdot d(l_1, L^*), \ldots, a_n \cdot d(l_n, L^*)) \leq \max(a_1 \cdot d(l_1, L), \ldots, a_n \cdot d(l_n, L))$ for every other possible location L. One might also omit the weighing factors $a_1, \ldots, a_n$ (which were representative of the amount of data in MB) in this definition, or replace them by the numbers $c_1, \ldots, c_n$ of distinct data transfers, depending on how the wait times of users are valued.

If network distance is defined as the inverse of bandwidth (which might be desirable for datasets consisting of large items), the primary definition of center of gravity is again a preferred choice. If a key goal is to minimize waiting times for users until a data transfer finished, then one might indeed choose to migrate to the center of gravity without taking the migration distance into account. For example, if users $U_1, \ldots, U_n$ fetch $a_1, \ldots, a_n$ MB of data from this dataset in time period T, and if the bandwidth available to the users is $B_1, \ldots, B_n$ MB/s, respectively, then each user $U_i$ will have $a_i/B_i$ seconds of waiting time, and it is reasonable to minimize a sum of these waiting times for all users, which is indeed the definition of center of gravity for this definition of network distance as $1/B_i$.

A first way of determining the usage patterns assumed in the definition of the center of gravity of a dataset is to assess a demand arising from various regions during the dataset's recent past (e.g., triggered by consumers or people). A second way of determining these usage patterns is to assess the movements of people and entities residing outside the storage cloud infrastructure that have an association with the dataset. Other means of determining the center of gravity of a dataset are similarly contemplated by embodiments of the invention, as will become apparent to those skilled in the art given the teachings herein.

With respect to the second way of determining usage patterns, if certain types of datasets belong to users or entities and their major use is by their one or more owners, then if a user or an entity that is served by a regional data center moves to a new geographical region in a more permanent sense, it may be beneficial to move their datasets, along with them to a regional storage center located nearest to the new location during that period of time. Local access to data reduces network latency, congestion, and power consumption, among other benefits. However, if the user's or entity's move is only temporary (e.g., a vacation or a short business trip), the converse may be true.

As will be described in further detail below, embodiments of the invention provide a means for managing the mostly automatic duplication and migration of data to improve overall global system efficiency and resiliency, among other system characteristics. This is particularly important given that the generation, use, and retirement of data varies temporally and spatially across regional storage centers constituting such a system.

Figure 4:
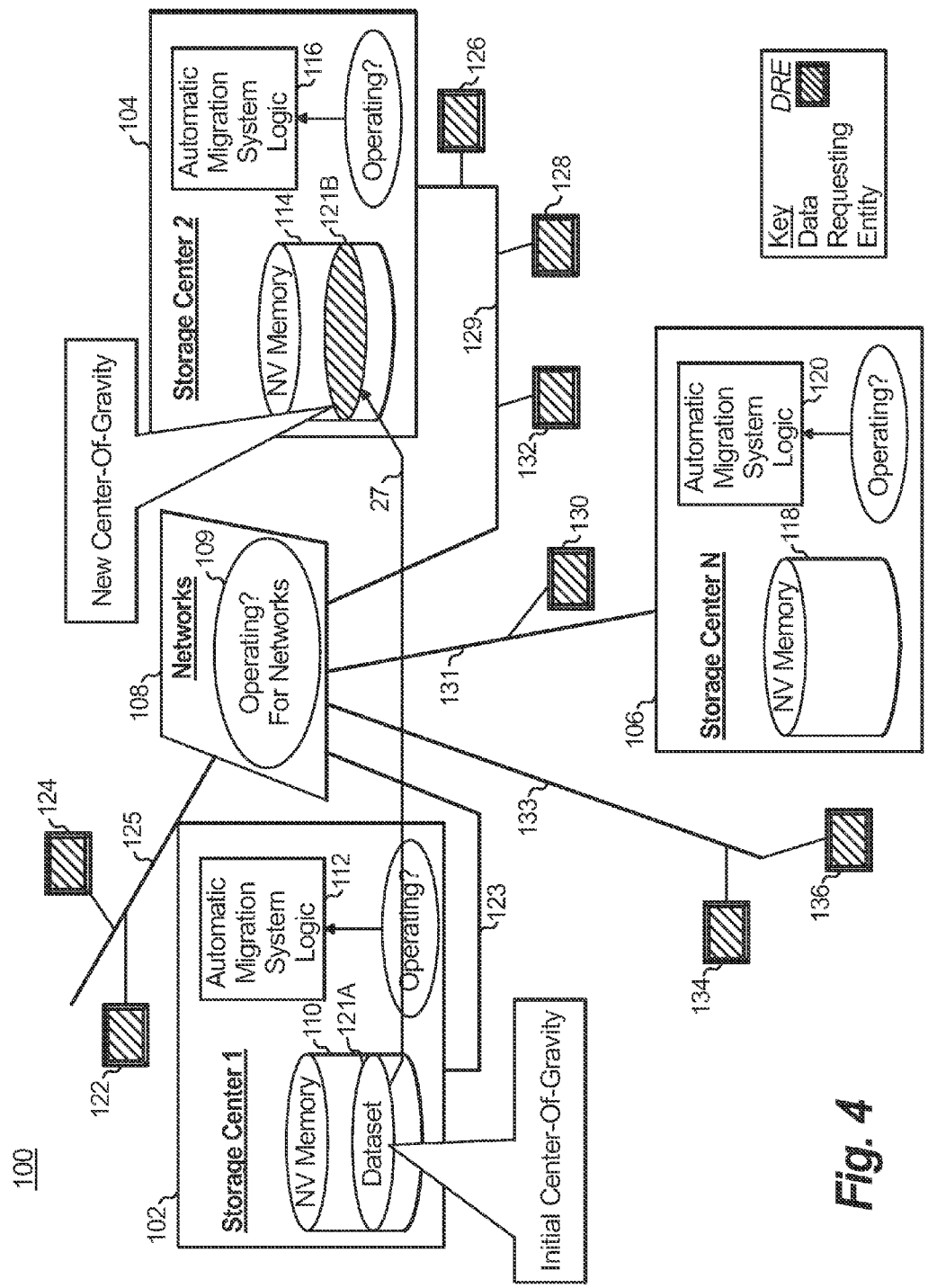
FIG. 4 is a conceptual view depicting at least a portion of an exemplary global storage system (i.e., cloud) illustrating a first dataset migration scenario, according to an embodiment of the invention.

FIG. 4 is a conceptual view depicting at least a portion of an illustrative global storage system (e.g., cloud) 100, according to an embodiment of the invention. The storage system 100 is operative to manage migrations and/or duplications of datasets among multiple storage centers that serve different geographical regions, but yet act together as a single global storage cloud service. It should be emphasized that the people or entities described with respect to the second way of determining usage patterns exist outside of the storage system 100. They may trigger actions within the storage system but they are not formally part of its definition.

In general, migrations and/or duplications of datasets may be triggered by, among other factors: (i) growth or contraction in demand for datasets across geography and over their life cycle; (ii) the movement of users or entities into or out of given geographical regions; (iii) changes in network distance; and/or (iv) growth or reduction in capacity of the regional data centers. The global storage system 100 comprises local (i.e., regional) storage centers, networks (e.g., Internet), and a plurality of data requesting entities.

With reference to FIG. 4, the global storage system 100 includes a plurality of storage centers, 102, 104, and 106, each of the storage centers 102, 104, and 106 are able to communicate with one another via a network 108, or an alternative communication means. Storage centers may exist at different geographical locations L throughout the world. In conjunction with a discussion of the term "center of gravity," L was previously defined as "for every other location L." In this context, L is a variable that represents the location of each storage location within system 100.

The network 108 is shown conceptually, in this embodiment, as being coupled with the respective storage centers 102, 104 and 106 by way of corresponding fixed (wired) connections (e.g., optical, copper, cable, etc.), although embodiments of the invention similarly contemplate that one or more of the connections may be established using wireless communication means (e.g., microwave, infrared, radio frequency (RF), etc.) in a conventional manner. More precisely, the connections are part of the abstract network; which may, for example, be the Internet, or comprise the public Internet and local Intranets in the regional storage centers. The network 108 may include one or more hardware or software operational monitor 109 operative to monitor one or more operating characteristics of the network. For example, the operational monitor 109 may be configured to broadcast a status of the network, bandwidth capacity, current average bandwidth, turnaround times, and/or other data important for determining network distance and thus ultimately centers of gravity for datasets and migration strategies.

Each of the storage centers 102, 104 and 106 comprises a memory and a controller. More particularly, storage center 102 includes a persistent (i.e., non-volatile) memory 110 and a controller 112 operatively coupled with the memory 110. Storage center 104 includes a persistent memory 114 and a controller 116 operatively coupled with the memory 114. Likewise, storage center 106 includes a persistent memory 118 and a controller 120 operatively coupled with the memory 118. Note, that the memory may physically be distributed over multiple storage devices, which also may have individual low-level controllers. This is state of the art for large-scale storage systems and data centers and not represented in detail in the figure. The controller in each of the storage centers preferably comprises automatic migration system logic operative to control the migration of one or more datasets stored in the corresponding memory.

A dataset 121A stored in the memory 110 of one storage center 102 may be migrated, over time, such that it moves to a different regional storage center 104 and is, there, maintained in the memory 114. The location of the dataset in time is thus indicated by the notations 121A and 121B for the dataset. Before the migration, the dataset is 121A; after the migration, the same dataset is 121B.

The system 100 includes a plurality of users and/or other entities, referred to herein broadly as data requesting entities (DREs), 122, 124, 126, 128, 130, 132, 134 and 136, residing in various geographical locations. Each of the DREs communicates via the network 108 through corresponding connections (e.g., 123, 125, 129, 131 and 133) established therebetween. In particular, DREs may communicate through the network 108 with one or more of the storage centers 102, 104, and 106.

Aspects of the system 100 for determining geographical data migrations may be understood by considering two illustrative cases in which migrations may be warranted and how each of these cases requires a specific set of architectural elements to support a migration decision. By way of example only and without limitation, a first migration case (Case 1), depicted in FIG. 4, assesses regional demand for each dataset by determining an address (e.g., Internet Protocol (IP) addresses) of a device (DRE) that initiates a request for the dataset and that is connected to the network 108 (e.g., the Internet). In the scenario where a device moves (e.g., a mobile device, cell phone, etc.) but one can still determine a location of the device, such as, for example, according to a cellular service provider or Internet Service Provider (ISP) from which a call or dataset request originates, the scenario may be considered as falling within Case 1.

As previously stated, Case 1 emphasizes architectural aspects of the global storage system 100 shown in FIG. 4 that gauge demand for a dataset, for example by noting an address (e.g., an IP address) of each of its DREs, thereby collectively assessing the demand for the dataset. The DRE is, in this example, a "stationary" device physically connected to the network 108, although a DRE is not limited to being stationary (e.g., in the case of a mobile user or entity). Instead of, or in addition to, the use of IP addresses, higher-level addresses may be used, such as, for example, user IDs, if those are needed to authenticate for use of the dataset. In each case, there is preferably a mapping from the addresses to locations, so that network distance can be computed based on the usage patterns collected initially for the addresses. For IP addresses, such a mapping is largely available on the Internet, based on Internet Service Provider (ISP) locations and locations of large enterprise networks. For higher-level addresses, the mapping to locations may be given by a registration of users to the global storage system (e.g., if the users had to enter their home address).

If the locations of users to a certain small set $r_1, \ldots, r_N$, were abstracted (i.e., with each user we do not associate their exact physical location $l_i$, but only one of $r_1, \ldots, r_N$ that is in close proximity to the user), then we can talk of "regions"—all users or entities to which location $r_j$ is associated are said to belong to region $R_j$. For instance, this could be done if IP addresses are used to identify locations, and the locations are only known up to a user's ISP—then the location may be chosen as that of the ISP, and all users served by one ISP belong to one region. The concept of regions will be utilized further below (e.g., explicitly added subsequently to figures that are similar to FIG. 4—for example, FIG. 6) to make physical geography more evident. Such indications of region should not be considered limiting to embodiments of the invention.

In the case with higher-level addresses, the global storage system 100 may also define user classes of different importance (e.g., according to service level agreements (SLAs) or prices for different priority classes) and use weighting schemas for the demand from various classes. In other words, if a user $U_i$ at location $l_i$ has weight $w_i$ according to such a scheme, and if otherwise the primary definition of center of gravity would be used, then instead a location L* with $w_1 \cdot a_1 \cdot d(l_1, L^*) + \ldots + w_n \cdot a_n \cdot d(l_1, L^*) \leq w_1 \cdot a_1 \cdot d(l_1, L) + \ldots + w_n \cdot a_n \cdot d(l_n, L)$ for all other possible locations L is now selected.

Figure 5:
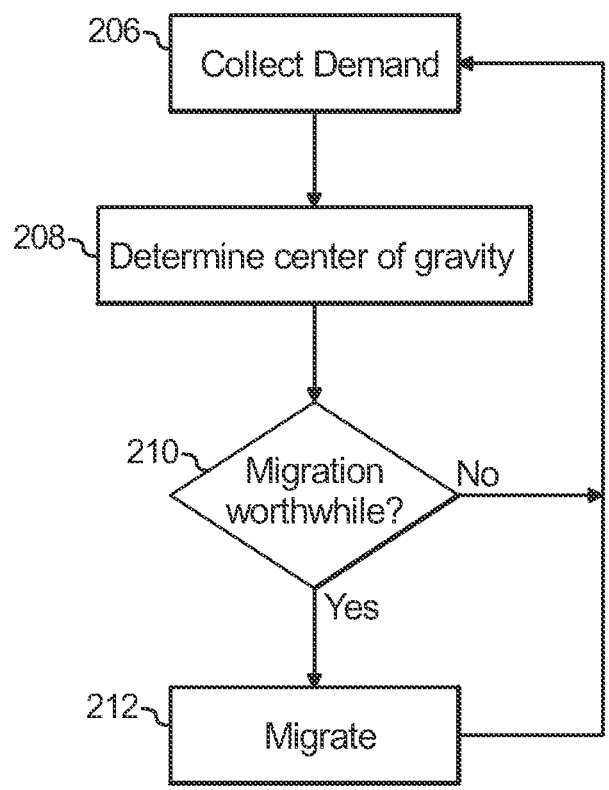
FIG. 5 is a flow diagram depicting at least a portion of an illustrative method for managing data migrations, according to an embodiment of the invention.

FIG. 5 is a flow diagram depicting at least a portion of an exemplary method 200 for managing data migrations, according to an embodiment of the invention. Method 200 utilizes regional demand in determining whether or not to migrate a dataset, although other or additional factors may be used in such determination, according to embodiments of the invention. The method 200 includes defining one or more rulesets 202 (e.g., selecting distance notions, etc.) and defining datasets 204, each of which may be performed in advance of an operation of the method. The term "ruleset" as used herein is intended to broadly refer to any criteria (e.g., rules, instructions, policies, etc.) which may be used to make a determination as to whether and/or how a prescribed action or actions are performed. A ruleset may include one or more rules. Defining one or more rulesets 202 may comprise, for example, defining optimization characteristics used to determine where to store datasets. During operation, the method 200 is operative to collect demand information regarding the datasets in step 206 and, as a function of the demand information, to determine a center of gravity of a requested dataset in step 208. In step 210, a determination is made as to whether or not data migration is worthwhile based at least in part on the collected demand information and center of gravity. If it is determined that data migration is not worthwhile, the method 200 continues at step 206 to collect demand information. Alternatively, if it is determined in step 210 that data migration is worthwhile, the method 200 proceeds to migrate the dataset in step 212, and the method then continues at step 206.

Figure 6:
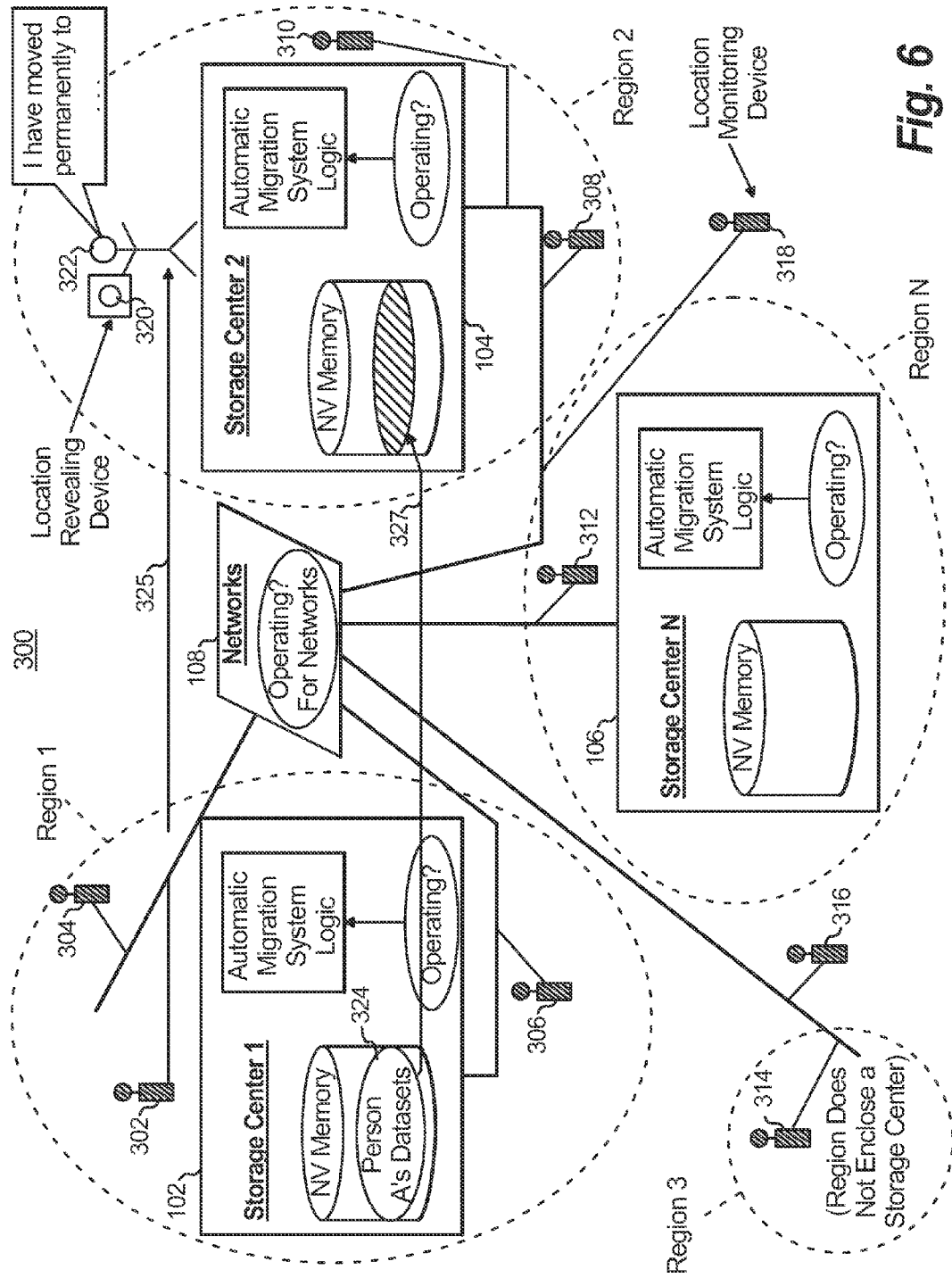
FIG. 6 is a conceptual view depicting at least a portion of an exemplary global storage system illustrating a second dataset migration scenario, according to an embodiment of the invention.

FIG. 6 is a conceptual view depicting at least a portion of an illustrative global storage system (e.g., cloud) 300, according to another embodiment of the invention. In FIG. 6, the geographical area served by the global storage system may be divided into multiple regions, 1 through N, where N is an integer. This particular division into regions should not be considered limiting. Regions may be non-overlapping geographical locations (i.e., regions): Region 1, Region 2, Region 3, and Region N, respectively, where N is an integer. However, in other embodiments, at least a portion of one region may overlap at least a portion of one or more other regions. Regions may just be used to indicate a particular geographical location but may also be used to connote a wider variety of opportunities for bundling.

As explained earlier, the term region may be used to refer to a conglomeration of a large number of people into an identifiable IP address: For instance, this could be done if IP addresses are used to identify locations, and the locations are only know up to the user's ISP—then the location may be chosen as that of the ISP, and all users served by one ISP belong to one region. The term region may also describe a higher level conglomeration of IP addresses or DNS names or independent DRE addresses. Such a conglomeration results in a smaller number of regions ($R_j$) being assigned within the global storage system 100 or 300. With the regions ($R_j$) reduced, fewer associated locations ($r_j$) must be preserved to profile the demand of a dataset over a time T. As a consequence, memory sizes/costs, associated with storing metadata for a particular dataset, may be thus reduced. Thus, it is to be understood that embodiments of the invention are not limited to the specific number or organization of regions shown, and that essentially any number or arrangement of regions in the global system 100 or 300 is contemplated, according to embodiments of the invention.

More particularly, FIG. 6 illustrates a second data migration case (Case 2) which associates a more permanent physical movement of one or more entities (e.g., company or group of people) or persons to its or his/her or their datasets, respectively. In contrast to Case 1, in Case 2, a notion of ownership of a dataset is considered, which must be known to the global storage system 300, so that the notion of "his/her or their datasets" is well-defined. Furthermore, in this method it is assumed that one or more owners of a dataset are the key user or users of this dataset, so that the one or more owners' location need be considered in order to determine the optimal place for a dataset. The ownership relation may be fixed, in some cases, may change in others, e.g., by role changes of employees in an enterprise.

It is to be appreciated that one can have both Case 1 and Case 2 with and without regions. Thus, although FIG. 4 depicts Case 1 without regions, and FIG. 6 depicts Case 2 with regions, embodiments of the invention are not limited to these illustrative scenarios, as will become apparent to those skilled in the art given the teachings herein. For instance, embodiments of the invention contemplate a scenario in which Case 1 is employed with regions or a scenario in which Case 2 is employed without regions. These other scenarios are similarly within the scope of embodiments of the present invention.

The global storage system 300, like system 100 shown in FIG. 4, includes a plurality of regional storage centers, 102, 104 and 106, in communication via a network 108, and a plurality of location monitoring devices (e.g., a cell phone tower), 302, 304, 306, 308, 310, 312, 314, 316, and 318. The system 300 may further include one or more location revealing devices, 320, which may be, for example, a cell phone connected with a mobile user or entity. In the case of a cell phone, the location revealing device 320 may not only serve to reveal the location of the user 322, but may also serve as a mobile data requesting entity (mobile DRE). The mobile DRE connects to a potentially hard-wired network through a cell tower (as represented by the location monitoring devices).

More precisely, according to an illustrative embodiment of the invention, a location revealing device 320 also has an owner, so that the current location of the device is assumed to the same as the current location of its owner. The device 320 may be set up to permit the forwarding of its location if the user wishes to use this method. One or more location monitoring devices 302, 304, 306, 308, 310, 312, 314, 316, and/or 318 may track the location of the location revealing device 320 and report it within the global storage system. A location-revealing device may also be configured to serve multiple and/or changing users. At the other extreme, a location-revealing device may be the user or entity 322 him/her/itself, as indicated by the callout "I have moved . . ." in FIG. 6. As previously explained, the geographical area served by the global storage system 300 may be divided into multiple regions, 1 through N, where N is an integer. Again, the motivation for using regions rather than exact locations are as in Case 1; namely, it may not be possible to obtain exact location information (e.g., a cell-phone tower as location-monitoring device may only forward its own location, so it defines a region), or it may be easier, at least computationally, to deal only with a few locations (of the regions) rather than with all possible locations, which may be large in number.

In the example shown in FIG. 6, Region 1 encloses regional storage center 102 and DREs 302, 304 and 306, Region 2 encloses regional storage center 104 and location monitoring devices 308 and 310, and Region N encloses regional storage center 106 and location monitoring device 312. Region 3 encloses one or more location monitoring devices 314 but, in this example, does not enclose a regional storage center. Furthermore, some location monitoring devices in the system 300 are not enclosed by any defined region, as is the case with location monitoring device 316, although each location monitoring device is still able to communicate with the network 108 via an established connection therewith. As described previously, the location revealing device 320 shown in FIG. 6 is associated with a mobile entity (e.g., a person 322). It should be emphasized again that the location revealing device 320 may also serve as a mobile DRE exchanging data with a cell phone tower (as represented by the location monitoring devices, e.g. 318, 316). In contrast, FIG. 4 showed DREs that are, to a degree, more geographically fixed (e.g., servers). However, one can also consider illustrative Case 1 (with multiple users or unknown ownership) for mobile DREs acting as location-revealing devices or whose location is determined by location monitoring devices. It is to be understood that embodiments of the invention are not limited to the specific number or organization of regions shown, and that essentially any number or arrangement of regions in the global system 300 is contemplated, according to embodiments of the invention.

It is easy to visualize movement in the second case (Case 2) depicted in FIG. 6. Specifically, arrow 325 indicates the movement of a user (person A) 322 from a first region, Region 1, and corresponding regional storage center 102, which encloses his/her dataset(s) 324, to a second region, Region 2. Given that the global storage system 300 may include heuristics that enable it to predict that user 322 has moved more permanently from Region 1 to Region 2 (as will be explained in further detail below), it may be desirable to migrate the user's dataset(s) 324 to the regional storage center 104 associated with Region 2, as indicated by arrow 327.

To generalize, Case 2 illustrates the physical movement of a user or entity relative to his/her, its, or their dataset(s). If only one owner is considered, the optimization formulas are preferably simple versions of those used for Case 1, where only one user is present. For example, the formula for deciding on migration with the primary definition of center of gravity essentially involves searching for a location $L\hat{}$ such that $a \cdot d(l, L\hat{}) + b \cdot d(L', L\hat{}) \le a \cdot d(l, L) + b \cdot d(L', L)$ for all other locations L', where l is the location of the owner of dataset D, dataset D is of size b megabytes and resides at a location L' before time period T, and the dataset owner is expected to transfer a megabytes to or from the dataset in time period T. If more than one owner is considered, the idea of weights ($w_i$), first introduced with respect to higher level addresses of global storage system 100 shown in FIG. 4, may be employed to govern the influence that each of at least a subset of the owners exerts over a dataset in a center of gravity calculation.

Figure 7:
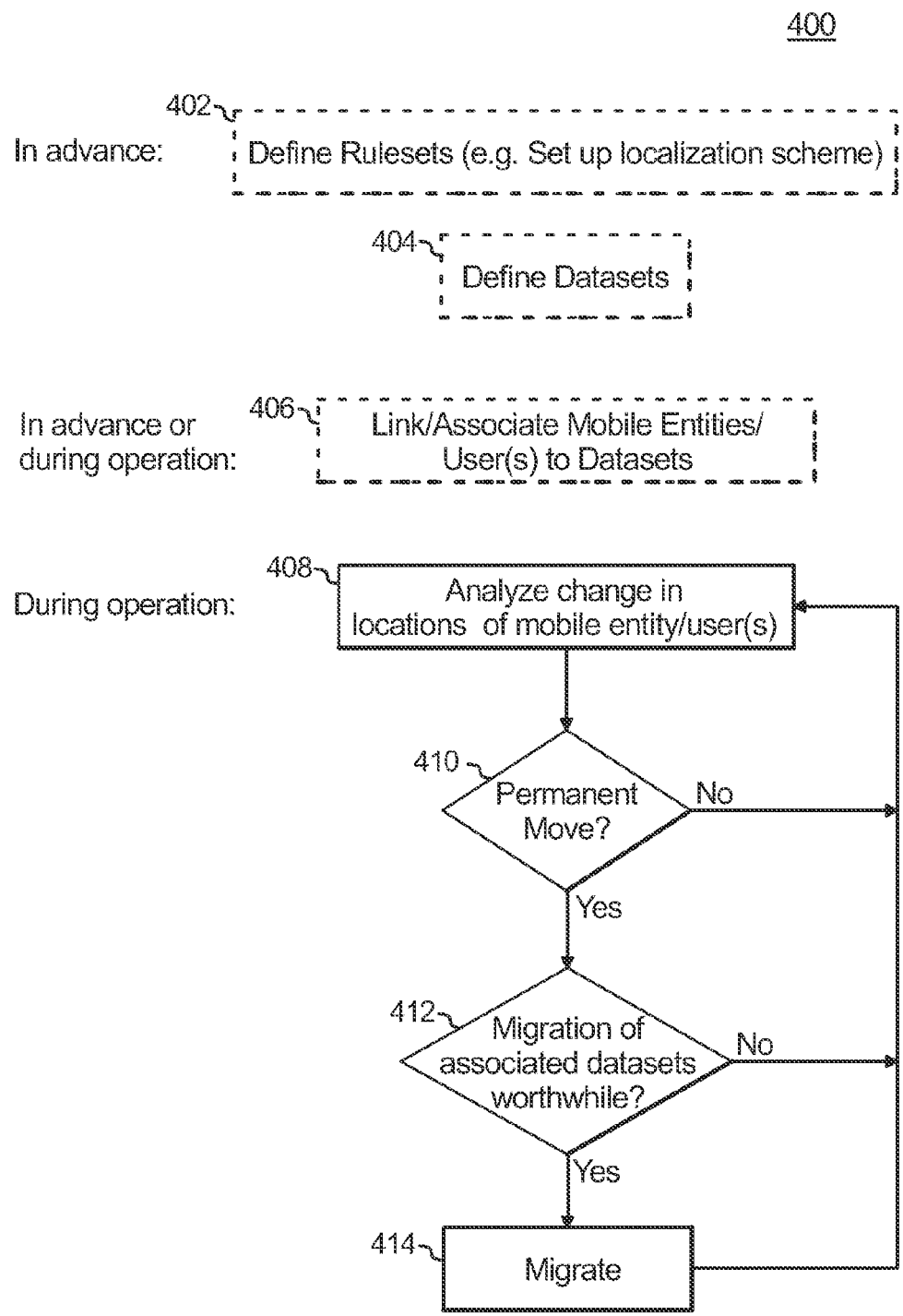
FIG. 7 is a flow diagram that depicts at least a portion of an exemplary method for managing dataset migrations which assesses physical movement of a user (e.g., entity or person), according to an embodiment of the invention.

With reference now to FIG. 7, a flow diagram depicts at least a portion of an exemplary method 400 for managing dataset migrations which assesses physical movement of a user (e.g., entity or person), according to an embodiment of the invention. As apparent from FIG. 7, certain steps in the method 400 are performed in advance of an operation of the method, in advance of or during operation of the method, or during operation of the method. Specifically, in advance of an operation of the method 400, rulesets (e.g., set up localization scheme and determine criteria for permanence of a move) are defined in step 402 and datasets are defined in step 404. In step 406, which may be performed either in advance of or during an operation of the method 400, respective links are created associating mobile entities/users to their corresponding datasets. When done in advance, step 406 may comprise, for example, an explicit registration of the dataset under the identity of the user. If no such registration is available, then the global storage system may perform usage monitoring as in Case 1 under higher-level addresses and, upon seeing only one user for a long time, assume that the dataset can be treated as in Case 2.

During operation, method 400 is operative to analyze any change in location (i.e., move) of the respective entities/users in step 408. If it is determined, in step 410, that a discovered change is not a permanent move, the method 400 proceeds back to step 408 to monitor for changes in entity/user location. Alternatively, if it is determined in step 410 that the move is permanent, the method 400 decides, in step 412, whether or not a migration of the dataset(s) associated with that entity/user should be performed. If it is determined that a dataset migration should not be performed, the method 400 proceeds back to step 408 where it continues to monitor for any changes in entity/user location. Alternatively, if it is determined in step 412 that a dataset migration should be performed, the method 400 performs the dataset migration in step 414, after which the method 400 proceeds to monitor for changes in entity/user location in step 408.

Figure 8:
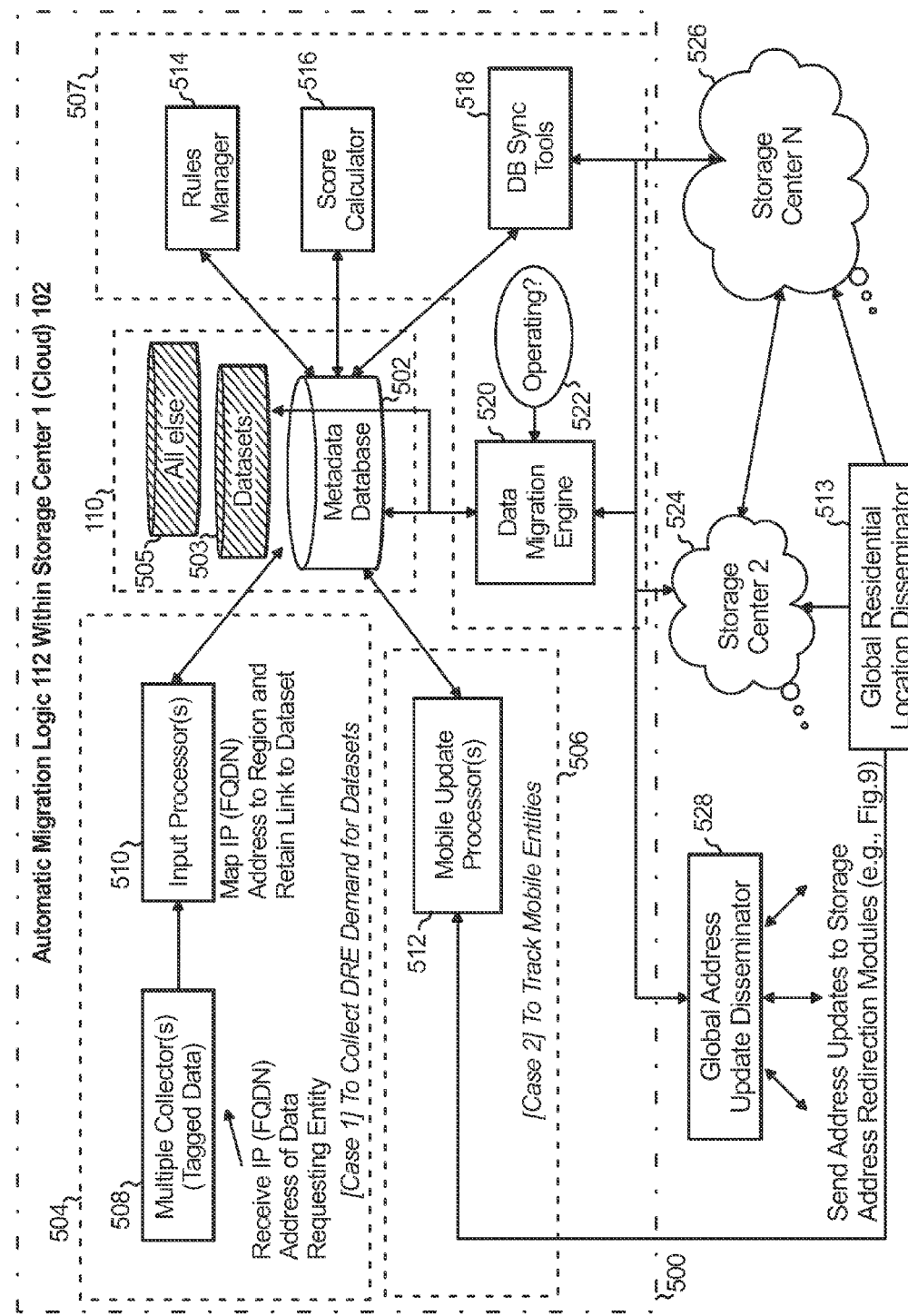
FIG. 8 is a block diagram depicting at least a portion of an exemplary regional storage center suitable for use in a global storage system, according to an embodiment of the invention.

FIG. 8 is a block diagram depicting at least a portion of an exemplary regional storage center 500 suitable for use in a global storage system (e.g., systems 100 or 300 shown in FIG. 4 or 6, respectively), according to an embodiment of the invention. The regional storage center 500 includes a logical view of metadata database 502, or alternative memory, operative to store information about datasets 503, among other items. The information, or data, within metadata database 502, the datasets themselves 503, and all else 505 may be stored within memories 110, 114, and 118 in regional storage centers 102, 104 and 106, respectively, shown in FIG. 4. The data 505 labeled "all else" may include, but is not limited to, actual code used to support migration logic processing, as represented by one or more of boxes 508, 502, 512, 514, 516, 518, 520 and 522. The metadata database 502 may describe the status, ownership links (e.g., to mobile users or entities), and usage of the datasets stored within the memories 110, 114 and 118 (see FIG. 4). A more detailed description of the content of the metadata database 502 will be provided herein below; in particular, with respect to Table 1, FIG. 10, and FIG. 11. Moreover, the database 502 may maintain other data about the mobile users or entities used to determine whether movements of the mobile users and entities are temporary or more permanent in nature, as will be discussed with respect to FIG. 12.

The storage center 500 includes at least one of two primary feeds for supplying data relating to dataset migrations and relocations to the database 502. Specifically, a first module 504 is operative to collect DRE demand for datasets, and a second module 506 is operative to track mobile entities. Each of the first and second modules 504, 506 was previously discussed in conjunction with FIGS. 4 through 7. More particularly, module 504 provides a mechanism for the collection of DRE demand according to Case 1, as described with respect to FIGS. 4 and 5, and module 506 provides a mechanism to track mobile entities according to Case 2, as described with respect to FIGS. 6 and 7.

With continued reference to FIG. 8, the first module 504 includes one or more collectors, represented collectively as module 508, coupled with one or more input processors 510. Each of the collectors 508 is operative to receive at least one IP address, or fully qualified domain name (FQDN), of a DRE in the global storage system and the associated dataset request and to generate a metadata tag that indicates the location of the DRE, which requested the dataset, by assessing the address of the DRE. More particularly, the collector 508 copies the addresses of dataset request initiators (e.g., DREs) along with associated metadata from storage transactions, then queues up the collected data for further processing by the input processor(s) 510. This optional queuing step is beneficial for decreasing real-time demands on the core processing.

The input processor(s) 510 is(are) operative to map the IP address/FQDN and the associated dataset request received from the collectors 508 and to generate a link to the requested dataset. The input processor(s) 510 isolates the dataset, tags it, performs some elementary analysis (including, for example, mapping the initiator address—an IP address or a fully qualified domain name; in short FQDN—to a region), and ultimately loads the location or increments a region associated with the dataset in the one or more meta database 502 entries for each dataset within the incoming storage transaction stream. The location of the dataset itself is clearly indicated, or is revealed, by where it is stored: in this example, storage center 1 (labeled 102). The dataset size is also retained as metadata in this embodiment. Thus, the relevant information for computing a total network distance (for the dataset over a period T) and for indicating the size of the dataset is retained in the metadata database 502.

The second module 506 includes one or more mobile update processors 512 operative to receive location updates for mobile users and/or entities in the global storage system. More particularly, at least a subset of the mobile update processors 512 is first operative to receive changes in the geographical addresses of users and/or entities (e.g., collections of people, mobile robots/drones, etc.) from a global residential location disseminator 513. The global residential location disseminator 513 is operative to distribute the respective residential (i.e., geographical) addresses of users and/or entities linked to specific datasets resident in the global storage system. The metadata database 502 is searched for dataset records that are linked to the users and/or entities by the mobile update processor(s) 512. For each dataset that is linked to one or more users and/or entities, the mobile update processor(s) 512 updates the geographical addresses (i.e., location) of each owning user and/or entity.

The regional storage center 500 further comprises a rules manager module 514, a score calculation module 516, a database synchronization tools module 518 and a data migration engine 520 operatively coupled with the metadata database 502. The migration logic within the regional storage center 500 may be advantageously implemented as a modular system. Since each of the modules 514, 516, 518, as well as module 522 (not yet introduced), may communicate directly with other constituent modules, it is useful to refer to the collective group of modules as a migration decision and execution module 507. This migration decision and execution module 507 is configured to implement the high-level decision logic described with reference to FIGS. 5 and 6.

More specifically, the rules manager 514 contains rules used by the score calculation module 516. Keeping rules separate from the actual calculations makes the system easier to maintain from a development standpoint and is thus preferred, although embodiments of the invention are not so limited. Rules may, in particular, comprise: (i) a choice of network distance measure; (ii) a length of time period T for which usage is tabulated (which, in some embodiments, is also the frequency with which the score calculation module 516 operates per dataset); and (iii) whether migration effort may be considered in addition to the center of gravity (when the next location for a dataset is chosen). The database synchronization tools module 518 allows metadata databases in different storage centers (e.g., 524, 526, also referred to herein as data centers), located in different geographical regions, to share and to synchronize their metadata (i.e., data about the datasets). The data migration engine 520 is used to migrate a dataset from one area to another. The score calculation module 516 is operative to analyze records in the database 502 using rules to identify and prioritize datasets for automatic migration. Hence, the score calculation module 516 is the module that actually computes centers of gravity and the optimization formulas as described previously. In addition to computing optimal placement for each dataset by itself, it may also take cross-dataset criteria into account (e.g., how much data can be migrated at any time, or knowledge about some storage centers reaching storage limits and thus no longer being possible locations for migration consideration).

The data migration engine 520 is coupled with the actual dataset storage 503, with the metadata database 502, and with one or more other regional storage centers, 524 through 526, in the global storage system. The data migration engine 520 is also coupled with a global address update disseminator 528 which is operative to send address updates to one or more storage address redirection controllers. As will be discussed in more detail with respect to FIG. 9, one or more global address update disseminators may propagate up-to-date information about where datasets are stored—in which storage center 500, 524, and 526—to local address virtualization systems (referred to as "storage address redirection modules" in FIG. 9), embedded in the network 108 or in the initial network-related elements of the storage centers (e.g., reverse proxies or web servers), for the purpose of directing requests from DREs (consumers) to the storage center 500, 524, and 526 containing the dataset of interest. Furthermore, as will be discussed with respect to FIG. 9, the global residential location disseminator 513 may be used to provide storage centers 500, 524, and 526 with the present and likely future location of end consumers who are linked to some of the datasets as their owners.

Automatic migration decision logic, or an alternative control mechanism, in the score calculation module 516 or in the data migration engine 520 is operative: (i) to exploit information about associated service level agreements (SLAs); (ii) to consider general availability issues governing one or more datasets and the network 108; and (iii) to determine an appropriate timing of dataset migration (e.g., off-peak, to minimize network congestion, etc.). For example, SLAs may describe how a dataset has been and must continue to be managed within the source storage center and the target storage center, respectively, of the migration. Considerations may involve logical storage volumes, virtual machines, flat file data, databases, and etcetera.

The regional storage center 500 may further include a hardware operational module 522 coupled with the data migration engine 520, or with one or more other modules in the regional storage center. The hardware operational monitor 522 (labeled "Operating?") is operative to monitor a status of one or more operating characteristics indicative of the data migration engine 520. For example, the hardware operational monitor 522 may perform at least one of the following: (i) assess an operational state of a corresponding regional storage center 500 (e.g., functional, not functioning, partially functional); (ii) broadcast the operational state of the corresponding regional storage center to all other hardware operational monitors associated with other regional storage centers (e.g., regional storage centers 524 through 526); (iii) retrieve the operational state of all other storage centers through the network; and (iv) inform the automatic migration decision logic in the corresponding data migration engine 520 supported on its regional storage center 500.

Hence, FIG. 8 primarily describes illustrative logic and interactions of the automated migration logic 112, 116, 120 enabled within storage centers 1, 2, and 3 (102, 104, 106, respectively). Principle components of the automated migration logic may include, for example, the metadata database 502, the first module 504 (for Case 1—operative to collect DRE demand for datasets), the second module 506 (for Case 2—operative to track mobile entities), and the migration decision and execution module 507. Separate systems according to the embodiments of this invention may be enabled by selecting one of the first module 504 and the second module 506. The combined system, which includes modules 504 and 507, requires mathematical inequalities that combine (i) a re-assessment of the optimal storage location L based on historical network traffic collected over period T, described with respect to Case 1 (FIGS. 4 and 5) and (ii) a weighting of the choice of the optimal storage location L based on a present residential location of actual consumers—one or more persons or mobile entities—linked to the dataset, described with respect to Case 2 (FIGS. 6 and 7).

Figure 9:
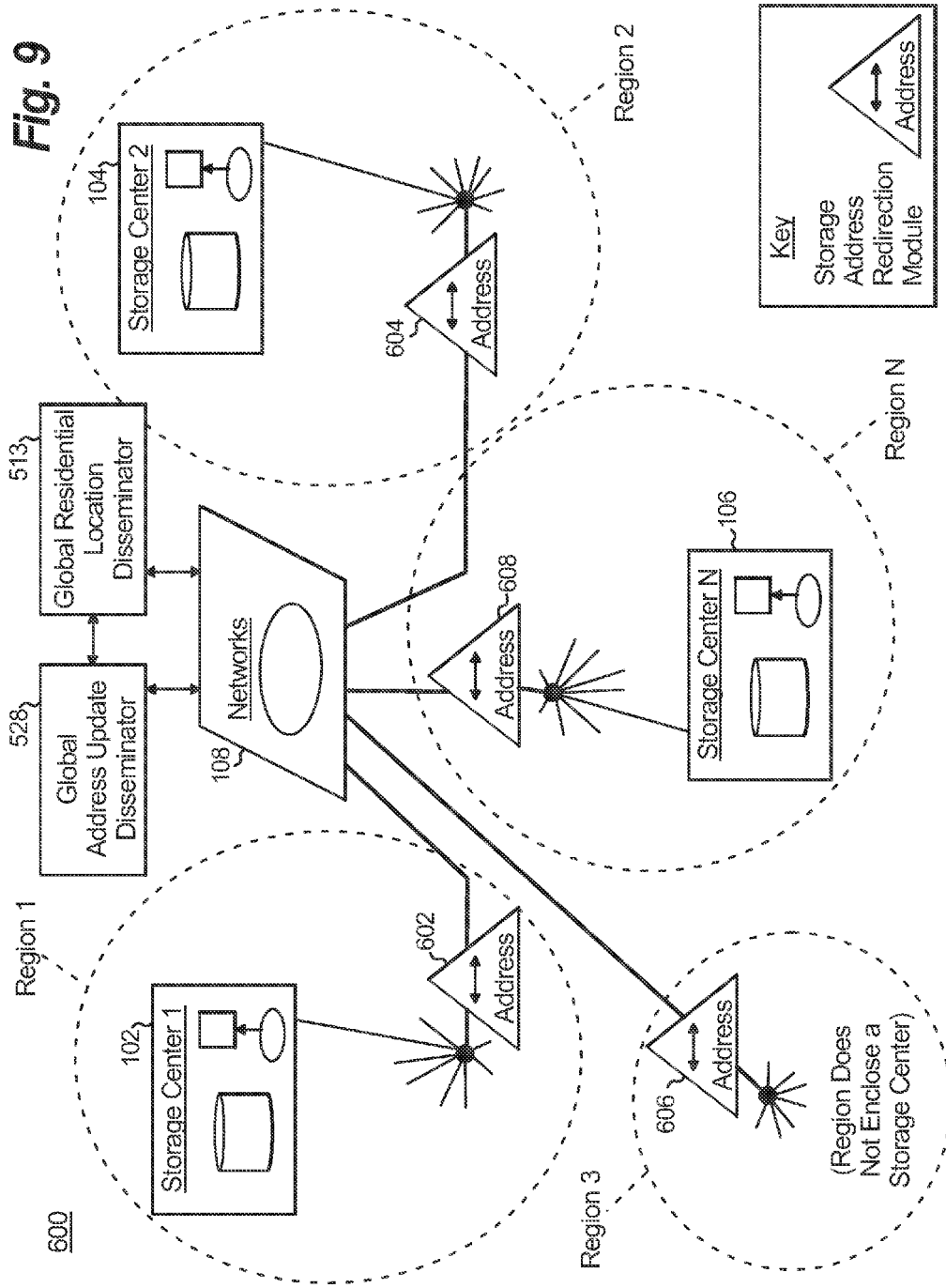
FIG. 9 is a block diagram depicting at least a portion of an exemplary global storage system, according to an embodiment of the invention.

Support for a virtual storage is also required and will be explained in further detail in conjunction with FIG. 9. Specifically, FIG. 9 is a block diagram depicting at least a portion of an exemplary global storage system 600, according to an embodiment of the invention. Global storage system 600 includes a plurality of regional storage centers, 102, 104 and 106, in communication via a network 108. The geographical area served by the global storage system 600 is divided into multiple regions, 1 through N, where N is an integer. In this manner, the global storage system 600 is similar to the illustrative global storage systems 100 and 300 shown in FIGS. 4 and 6, respectively.

The global storage system 600 further includes a global residential location disseminator 513 and a global address update disseminator 528, which may be implemented in a manner consistent with the global residential location disseminator 513 and a global address update disseminator 528 shown in FIG. 8, although embodiments of the invention are not limited to any specific implementation of these modules. As stated above, the global residential location disseminator 513 is operative to distribute the respective residential (i.e., geographical) addresses of users and/or entities linked to specific datasets resident in the global storage system 600. A change in residential address may be indicated by one or more factors, as will be discussed in further detail below. The global address update disseminator 528 is operative to send address updates to one or more storage address redirection controllers.

Each geographical region in the global storage system 600 may include a corresponding storage address redirection module, or similar control mechanism. More particularly, Region 1 includes address redirection module 602, Region 2 includes address redirection module 604, Region 3 includes address redirection module 606, and Region N includes address redirection module 608. Collectively, the address redirection modules 602, 604, 606 and 608 form a storage address redirection system of the global storage system 600.

Applications using the datasets of the global storage system according to embodiments of the invention may obtain a physical address (or access the dataset via indirection without learning of its physical address) of any required dataset from a nearest storage address redirection module. The same holds true if datasets are virtual entities defined by the global storage system but comprising a collection of user-defined files, etc., if the user wishes to access an individual file, etc. Through this address system, a request for a dataset may be redirected to one of the N regional storage centers within the global storage system, such as, for example, via Uniform Resource Locator (URL) redirection, volume redirection, etc. A user will have a permanent identifier for a stored data element, such as a file or a web page that the user wants to read or in some cases write. This might, for example, be a URL or an identifier filename specific to the global storage system, used after logging into the storage system via a fixed identifier or to a specific storage center. As the actual location of the desired storage element may change due to migration, each of the address redirection modules are preferably able to transform and route the request to the storage center where the data element currently resides.

A stationary or mobile DRE may itself include the logic and memory of the storage address redirection module. In this situation, updates that represent the new physical address of a dataset may be propagated by the global address update disseminator 528 to the DRE. This works well if datasets have one or very few owners that use them (e.g., Case 2). Conveniently, this implementation of address redirection does not significantly impact the existing network structure of the Internet. However, most of the previously mentioned implementations of address redirection do not impact the existing network structure of the Internet, and those that do only use it by existing mechanisms, such as DNS updates.

Updates to the physical address of a dataset are made, in accordance with an embodiment of the invention, when a migration of a dataset from one regional storage center to another regional storage center has completed. Once the dataset migration is complete, the data migration engine 520, and other logic, shown in FIG. 8 informs the global address update disseminator 528, which synchronizes the update of the physical address of the dataset with all the storage address redirection modules 602, 604, 606 and 608. Actual asynchronous updates may involve control logic residing in each of the regional storage centers.

Migration of datasets from a source regional storage center to a target regional storage center in the global storage system may involve a broad array of approaches including, but not limited to, aggregation, time-interleaving, and off-peak execution of migrations. For example, using an aggregation approach for dataset migration, datasets are aggregated, packaged together, and migrated in a single package of data. The aggregation approach allows evaluation of datasets being migrated from one regional storage center to another regional storage center and packaging the datasets into a bulk file transfer. Part of the evaluation for bulk file transfer is the dataset itself. If the dataset is a set of files that need to be moved, then doing a bulk transfer will likely be performed more efficiently than transferring individual files. Packaged datasets can be moved based on priority. Higher priority datasets may not be packaged but moved on their own. Lower priority datasets may be packaged and moved at a specific time (e.g., during off-hour/non-peak times).

Using a time-interleaving approach to dataset migration, migrations of datasets are time-interleaved and/or may occur regularly across regional storage centers. A decision to migrate a particular dataset, for example, may occur once a month, although embodiments of the invention are not limited to any specific time schedule for dataset migration. An equation, or other expression, for making a dataset migration determination can be formulated which weights attributes that are available at the time the migration decision is to be made.

Using off-peak execution of dataset migrations, usage of a dataset may be characterized, or otherwise profiled, across one or more time windows to determine a time when the dataset is least frequently used. During that off-peak time, the dataset may be advantageously migrated. An alternative to dynamic usage characterization, according to an embodiment of the invention, is to characterize the expected dataset usage in advance and provide such information to metadata fields governing dataset migration decisions. Attributes for timing of migrations will be further described herein below.

Migration decisions may be influenced by factors other than minimizing network distance among a group of "equivalent" consumers and distributers (regional storage centers). For example, one criterion, other than network distance, which can be employed to affect a dataset migration decision is to score a region, user and/or dataset in a manner which assigns priority to them and creates tethered relationships. Each region may only support a certain level of throughput to the various other regions. A region could have a priority assigned to it that would give datasets relocating to that region higher priority or give them higher bandwidth/throughput. Or, there could be a throttling of available bandwidth for the migration of data based on a priority of the dataset being migrated. Throttling can also be done based on a time of day the migration. For example, during off-peak times, more bandwidth can be assigned to the dataset migration effort and during peak usage times, less bandwidth can be allotted to the migration. Data and/or users can be assigned a priority which offers one data/user type a higher priority or bandwidth over another user data/user type. The region priority and/or data/user type priority is given a specific weight, which is then used to generate a score or other characteristic used for data migration priority.

In accordance with other embodiments, datasets may have a quality-of-service (QoS) tag associated therewith. This QoS tag can be used to constrain which region the datasets can be moved to, either directly (e.g., naming the regions or geographical areas such as countries), or as a function of a prescribed level of quality (e.g., availability guarantees, security measures taken, change control policies, compliance with certain regulations, etc.). Such QoS tags of a dataset can be specified in the associated metadata of the dataset. A dataset that is not permitted to move is considered to be "pinned." A dataset that is constrained to move to only certain designated regional storage centers is considered to be "restricted." A dataset that is free to move to any regional storage center location is considered to be "roaming." Each regional storage center could have a QoS associated with it and, based on that QoS, datasets may or may not be able to move to it. The QoS tag approach capitalizes on the observation that closest is not always better when it comes to dataset migration. In terms of the initial expressions for optimization described above, QoS tags restrict the set of possible locations L to be considered.

An additional benefit of the global storage system, according to embodiments of the invention, is an ability to relocate datasets from a regional storage center that is almost full to one or more other regional storage centers having additional storage capacity. As previously described, hardware operational monitors are operative to inform the data migration engine about the status of local (i.e., regional) and global storage centers. If the local storage center fills to near capacity, the data migration engine (e.g., 520 in FIG. 8) can identify neighboring regional storage centers to off-load the datasets, or can choose to migrate, proactively, datasets ahead of schedule relative to when they would otherwise be moved, among other dataset migration choices. Considering the latter option, a functional relationship between capacity and migration acceleration may be devised, according to embodiments of the invention. In terms of the initial expressions for optimization previously described, considering the capacity limits of data centers again restricts the set of possible locations L to be considered.

By way of example only and without loss of generality, Table 1 below illustrates an exemplary metadata table for a dataset that comprises attributes that can be used in making a migration decision. These attributes include, but are not limited to, metadata such as specific who, why, what, when, where, and how decision details for dataset migration.

TABLE 1

|  | Name | Purpose |
|---|---|---|
| Who? | Regional demand | Total demand accumulates over a time window for each region in the global storage system. (Mostly for Case 1) |
|  | Prioritization | Users or groups are given priority or weight to affect the gravitational pull of a dataset. |
|  | Owning user(s) or entity(ies) | Indicates a user/entity that owns this dataset. (Mostly for Case 2) |
| Why? | Approved trigger thresholds | They can be times (e.g. if a dataset needs to follow daylight around the world), utilization (e.g. from the compute side of a data center), forced migration (e.g. turmoil in certain countries), and etc. |
| What? | Data movement policy | Explained with respect to FIGS. 10 and 11 below. Designated as "pinned," "restricted," and "roaming." |
| How much? | Migration throughput | QoS decisions can be made (e.g., migrations may be scheduled for quieter times so as to avoid flooding certain internal or external networks during their peak usage). |
| When? | Migration timing attributes | Time period when a dataset is least frequently accessed. |
| Where? | Residence of the mobile user or entity | Current primary residence of the owning user or entity. |
|  | QoS tags | Quality-of-service attributes required for this dataset |
|  | Qualified locations | List of regional storage centers where this dataset can move to; either entered directly or computed from QoS tags and the current QoS attributes of the regional storage centers |
|  | Data mirror | List of mirroring regional storage centers. |
| How? | Data mirror Other migration methods | |

As previously described with respect to FIG. 8, a center of gravity for DRE demand can be calculated or quantified from the metadata for a dataset as described by Table 1. Moreover, other details used for migrations such as prioritization of migrations for a specific set of users (over other users), the specified or calculated time for migration, location information and migration methods can also be articulated in the metadata for each dataset.

Figure 10:
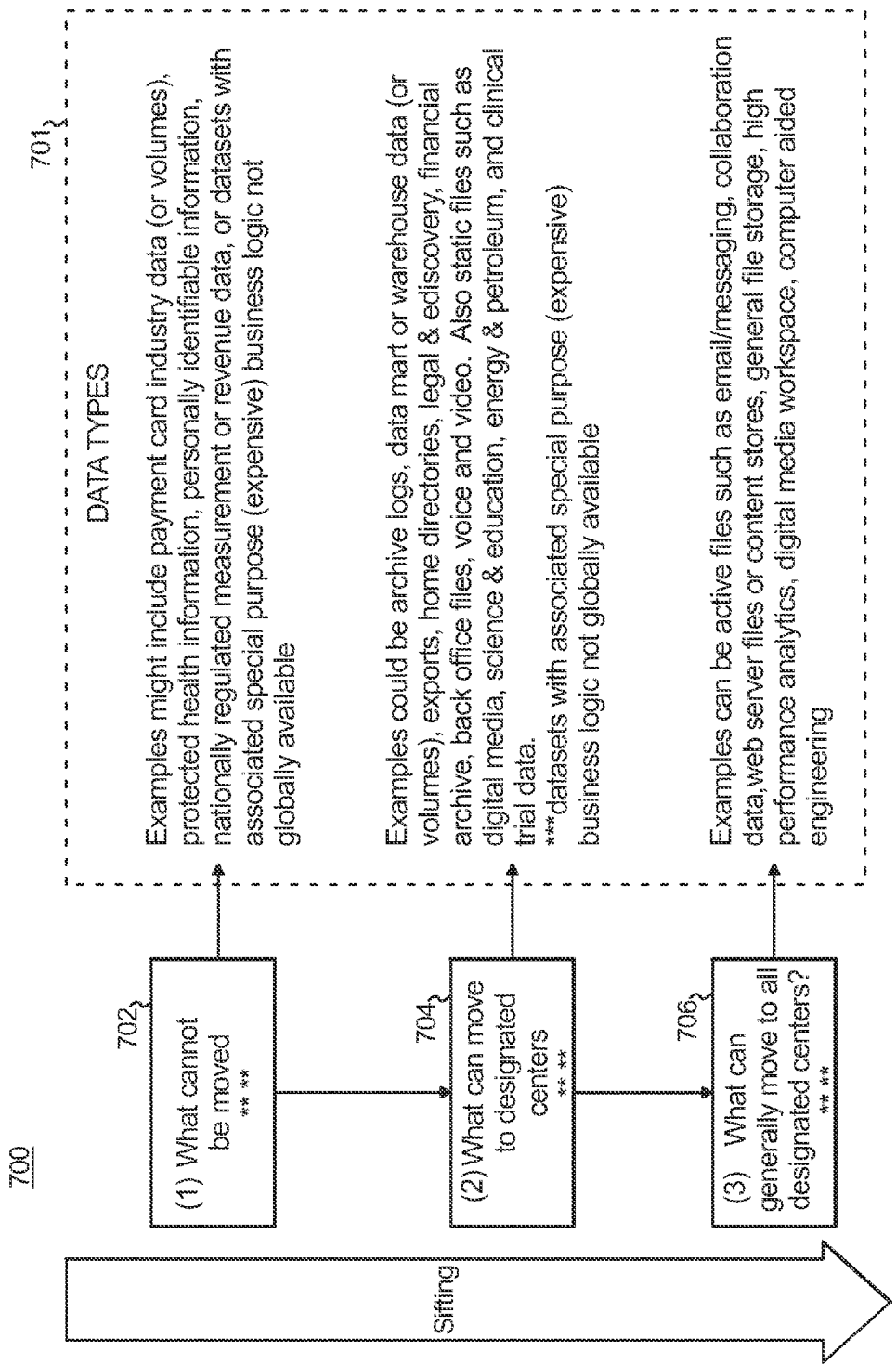
FIG. 10 is a conceptual view depicting exemplary a priori dataset migration decisions as a function of data type, according to an embodiment of the invention.

Some migration decisions can be made in advance regarding what data should or, in some cases, should not, be moved. FIG. 10 is a conceptual view 700 depicting exemplary a priori dataset migration decisions as a function of data type, according to an embodiment of the invention. With reference to FIG. 10, various types of data 701 are organized into three groups; namely, what data cannot be moved 702, what data can be moved to designated regional storage centers 704, and what data can move to every regional storage center 706. The type of data may determine an order in which dataset migration decisions are made. Thus, according to one embodiment, a migration decision is made first for the most restrictive data types, and is made last for the least restrictive data types; this is particularly useful if some regional storage centers are close to their capacity.

Examples of types of data that cannot be moved, based on, for example, their owners' or originators' specifications, may include, but are not limited to, one or more of payment card industry data (or volumes), protected health information, personally identifiable information, nationally regulated measurement or revenue data, and datasets with associated special purpose business logic not available for other regional storage centers (assuming that the regional storage center is part of a regional data center containing other functions). Examples of types of data that can be moved to designated regional storage centers, based on their owners' or originators' specifications, may include, but are not limited to, one or more of archive logs, data mart or warehouse data (or volumes), exports, home directories, legal and e-discovery information, financial archives, back office files, voice and video data, digital media, science and education data, energy and petroleum data, and clinical trial data with associated special purpose business logic not globally available. Examples of types of data that can be moved to any regional storage center(s), based on their owners' or originators' specifications, may include, but are not limited to, one or more of web server files or content stores, general file storage, high performance analytics, digital media workspace, computer aided engineering data, collaboration data, and email/messaging data if it is clear that those do not contain regulated data.

Figure 11:
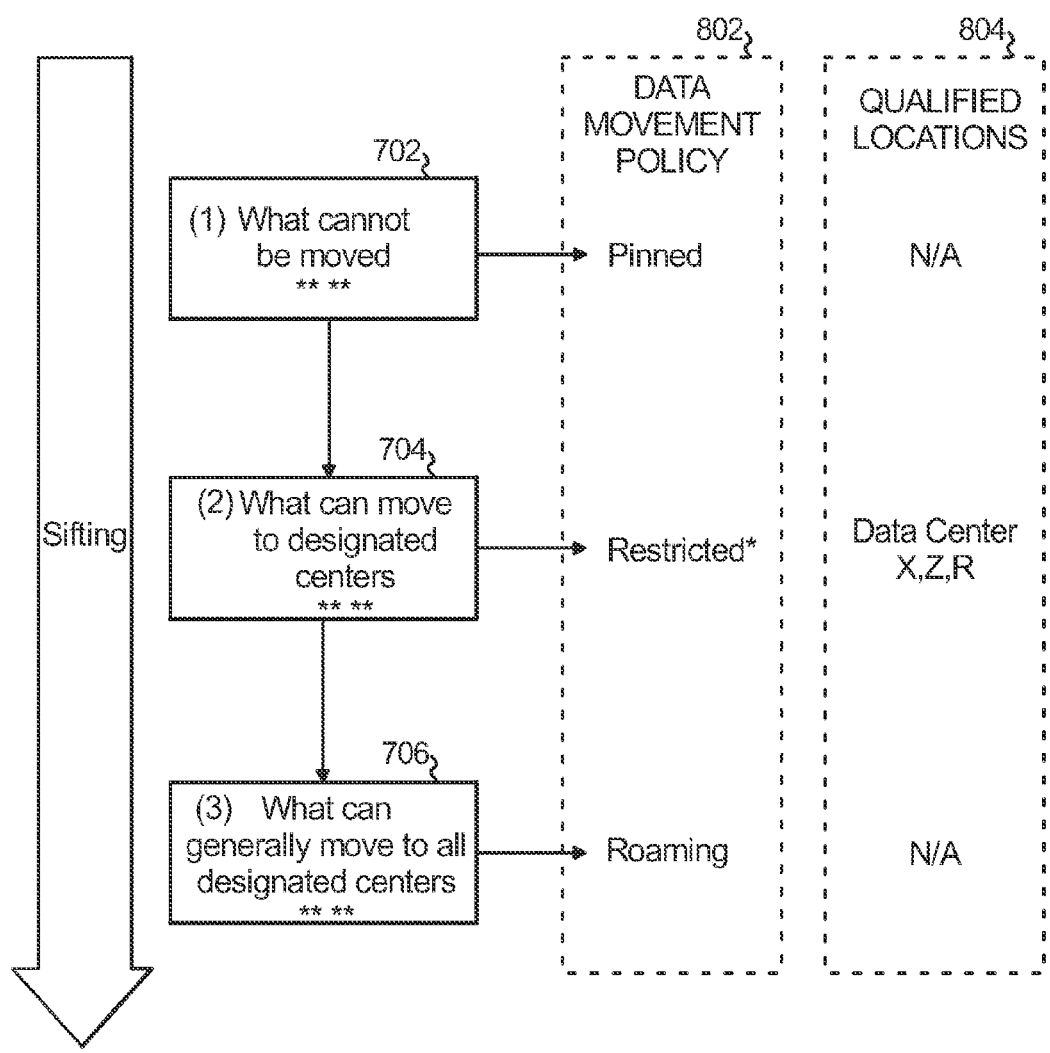
FIG. 11 conceptually depicts the formation of an exemplary data movement policy using the illustrative data types defined in FIG. 10, according to an embodiment of the invention.

Once different types of data have been identified as candidates for movement, the destinations of their corresponding datasets are specified in the associated metadata of the dataset using one or more attributes, examples of which were presented in Table 1. FIG. 11 conceptually depicts the formation of an exemplary data movement policy 802 using the illustrative data types 702, 704 and 706 defined in FIG. 10, according to an embodiment of the invention. A determination of qualified regional storage center locations 804 is then made based at least in part on the data movement policy 802. With reference now to FIG. 11, a dataset that is not permitted to move (702) is considered pinned, and thus no qualified regional storage center location is listed. A dataset that is permitted to move only to prescribed regional storage centers (704) is considered restricted, and thus the qualified regional storage centers to which the dataset can be moved will be those designated storage centers (e.g., data centers X, Z and R). A dataset that is permitted to move to every regional storage center (706) is considered roaming, and thus qualified regional storage centers for movement of the dataset need not be explicitly specified.

Figure 12:
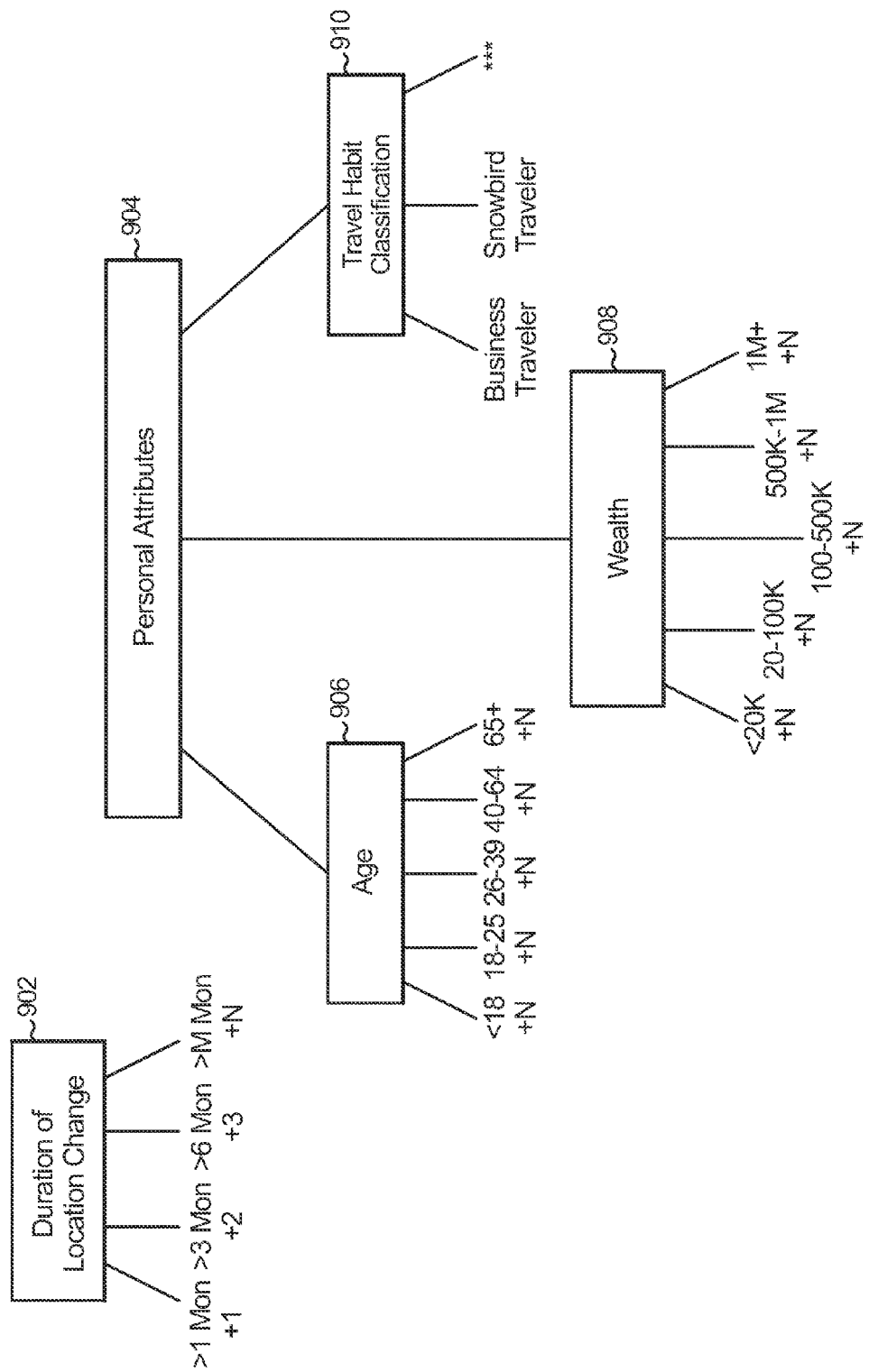
FIG. 12 conceptually depicts certain exemplary attributes which are used in making a dataset migration determination, according to an embodiment of the invention.

There are various other metadata attributes, other than those listed above, which can be assigned to the datasets or their owners, in accordance with other embodiments of the invention. FIG. 12 conceptually depicts certain exemplary attributes of owners which can be used in making determinations associated with more permanent locations of mobile users and/or entities ("residential locations"), according to an embodiment of the invention. In this embodiment, a duration of location change attribute 902 is employed, denoting the duration of the location change so far, along with personal attributes 904 of the users/entities, which comprise one or more of age information 906, wealth/financial information 908 and travel habit classifications 910. Another option might be the new location, e.g., whether it is known as a holiday resort. Here, relative measures of certainty (i.e., dataset migration scores) are assigned to corresponding attributes or subclasses of attributes.

For example, the duration of location change attribute 902 is arranged into subclasses. The duration of the stay, likely deduced from cell phone information collected according to Case 2, or other factors, should influence the triggering of migrations. The larger the number shown below the durations (e.g., ">6 Mon") in FIG. 12, the greater is the probability that the stay will be a permanent one for the person or mobile entity, and thus its associated datasets should more likely be migrated. In the example scenario shown in FIG. 12, the duration "greater than one month" is assigned a relative measure of certainty of +1, "greater than three months" is assigned a relative measure of certainty of +2, and "greater than six months" is assigned a relative measure of certainty of +3, although embodiments of the invention are not limited to any specific assignment of a certainty to a duration. The duration "greater than M months" may be assigned a relative measure of certainty of +N, where M and N are integer variables ranging from zero to a large number.

Likewise, a relative measure of certainty of +N is assigned to age subclasses "less than 18 years old," "18-25 years old," "26-39 years old," "40-64 years old," and "65 years old and greater." Again, N is an integer variable (different, perhaps, for each age class) that weighs the certainty. As will be discussed in further detail below, such information may be exploited by a heuristic approach that sums up at least a subset of the certainty indicators (e.g., duration of location change 902, age 906, wealth 908, travel habit classification 910, etc.) to predict a more permanent "residential location;" the higher the sum, the greater the certainty.

A threshold may be assigned for determining whether a residential change is permanent. Once the threshold is exceeded, the global residential location disseminator 513 may circulate the new residence of the mobile user or entity to the automatic migration system logic 112, 116, 120 for further processing and potential inclusion in an associated metadata table (e.g., Table 1) stored within a metadata database (e.g., database 502), as described previously with respect to FIG. 8. Thus, if appropriate weights to the indicators are assigned, the heuristic would resolve this scenario correctly. By way of illustration only, if a person chooses to fly to Florida for a weekend vacation, he/she isn't changing his/her residential location in as far as such a definition applies to the potentially costly process associated with dataset migration. Thus, neither the person's residential address should be changed nor should his/her associated dataset(s) be migrated. It is to be understood that the invention is not limited to any specific number of indicator attributes employed, nor are embodiments of the invention limited to any specific allocation of measures of certainty.

Another metadata attribute that can be used in making a migration determination, as shown in Table 1, is the existence and location of data mirrors. Dataset sources and dataset mirrors could be turned around relatively easily in a geographical migration decision, so that the dataset mirror becomes a dataset source, and hence the migration effort to the specific mirror data center is much smaller than to other data centers.

One or more heuristics can be employed to determine whether or not a given dataset migration is worthwhile. Some exemplary heuristics that may be used to make such a dataset migration determination may include, for example: (i) determining whether a sum of the transfers needed to service requests to a dataset if a move is not performed is greater than the size of the transfers needed to move the specific dataset; (ii) determining whether a sum of the transfers needed to service requests to a dataset with local caching configured if a move is not performed is greater than the size of the transfers needed to move the specific dataset; and (iii) determining whether, through moving a dataset to a nearer location, a defined service level agreement can be achieved or surpassed.

As previously discussed in connection with FIG. 4, a means for determining an optimal geographical location to store data, according to an embodiment of the invention, involves tracking the movement of data from each individual dataset from its regional storage center to the one or more users and/or entities requesting that data (see, e.g., the expressions for overall data transfers based on network distance that have been previously described herein). Over time, regional histories can be compiled for each dataset. In the metadata table (Table 1), regional demand for each dataset may be tallied by counting the number of requests emanating from DREs located in a particular region, preferably over a prescribed period of time T. With reference to Table 1 above, "regional demand" characterizes the cumulative demand from each region as defined by the global storage system. In other words, a cumulative demand number for each region is tabulated in the metadata table. Periodically, in accordance with embodiments of the invention, the cumulative demand numbers may be reset to zero when, for example, the dataset has been migrated or a new window of time is established for analysis, or a sliding window technique may be employed where the data are always present for the time period T back from the present.

With the regional demand profiled, each dataset may be relocated at periodic intervals to a historically optimal geographic position. According to embodiments of the invention, such a position is, for practical purposes, a closest selected regional storage center having sufficient capacity. In addition to overall capacity, the regional storage center may offer multiple storage tiers, and one may then restrict the possible locations to those regional storage centers where sufficient capacity exists within a correct storage tier to host the dataset. It should be understood that "storage tiering" may be defined broadly as a process of allocating higher performance groups of physical disks to applications and databases that require higher performance, while allocating lower performance groups of disks to applications and databases that require less performance. It may also include other QoS attributes within the same data center (e.g., a "better" tier may also have higher availability). Appropriate tiers are determined, according to one embodiment, by comparing dataset QoS tags with the storage center's QoS descriptions for their tiers.

As previously discussed (e.g., in Case 2), dataset migration of data related to a user or an entity may be triggered automatically, according to embodiments of the invention, by a discovery of a change in the user's or entity's geographical location. Regardless of the means used to detect changes in geographical location of the users or entities, there is a caveat which can be understood better by considering, by way of illustration only, two real-world scenarios: (i) first, user A leaves his/her home in Region 1 for a short vacation in Region 2; and (ii) second, having been offered a new job, user A moves permanently from Region 1 to Region 2. Specifically, migration of an entire dataset, especially when the dataset is a substantially large file, is an expensive process, primarily because its movement consumes substantial network bandwidth. Hence, in the first scenario, the global storage system would preferably not migrate user A's dataset. In formulating a migration decision, not only would GPS location information be used, but also some other relevant criteria should be considered. As shown in FIG. 12, exemplary criteria may include, but is not limited to: (i) duration of the regional change in geographical location (e.g., two days may be considered travel while two months may be indicative of a more permanent geographical change); (ii) personal attributes, like age, wealth of the user or entity, travel habits of the user, etc. (e.g., a 45-year old is not likely to spend two months in a place without it being permanent. A rich older man may spend 30% of his time in one location, 30% in another, etc.); (iii) access patterns of the user to a specific portion of relevant data within the dataset; and (iv) results of simple questions sourced to the user or entity, once a location change is indicated by the geographical change detected via the mobile device, etc.

As previously stated, decision logic that decides whether a change in residence has occurred is preferably located in a global residential location disseminator (e.g., 513 in FIGS. 8 and 9), although embodiments of the invention are not limited to any specific implementation of the decision logic. An important factor in this exemplary migration influencing mechanism is to develop a list of datasets that are most relevant to each of the users and/or entities managed by the global storage system. Embodiments of the invention are operative to generate a linking table, or alternative mapping means, for maintaining a correspondence between a given dataset and one or more entities using the given dataset.

With regard to the treatment of migration of datasets wherein at least a portion of the datasets are shared data among multiple users or entities, different and/or additional criteria may be used, according to embodiments of the invention, in a dataset migration determination. Consider, for example, a scenario involving a company which decides to move most of its employees from a first region (e.g., San Diego, Calif.) to a second region (e.g., Washington, D.C.); 90% of the employees move to Washington, D.C. while the other 10% remain in San Diego. A dataset migration decision, in this scenario, may involve evaluating the percentage of employees moving and/or statistics gathered on the use of common data shared by multiple individuals in the company, among other criteria. This scenario involves a mixture of Case 1 and Case 2—multiple users as in Case 1, but some are designated owners and receive preferential treatment represented by high weights, or their future location might be known in advance, as sometimes occurs in Case 2.

In accordance with embodiments of the invention, it is contemplated that, for Case 1, probabilities could be instituted within adaptive migration rules that might weigh what is learned about general and specific dataset usage locally within a storage center and globally across the aggregate of the storage centers. In this embodiment, the rules manager module 514 may, among others, contain functions to analyze historical usage of datasets. Using feedback processes, it might adapt (i.e., modify, "tune," or otherwise control) the existing rule sets in the database. Databases in different regional storage centers and/or regions would benefit by sharing data with each other through database synchronization tools (e.g., database synchronization tools module 518 shown in FIG. 8).

Figure 13:
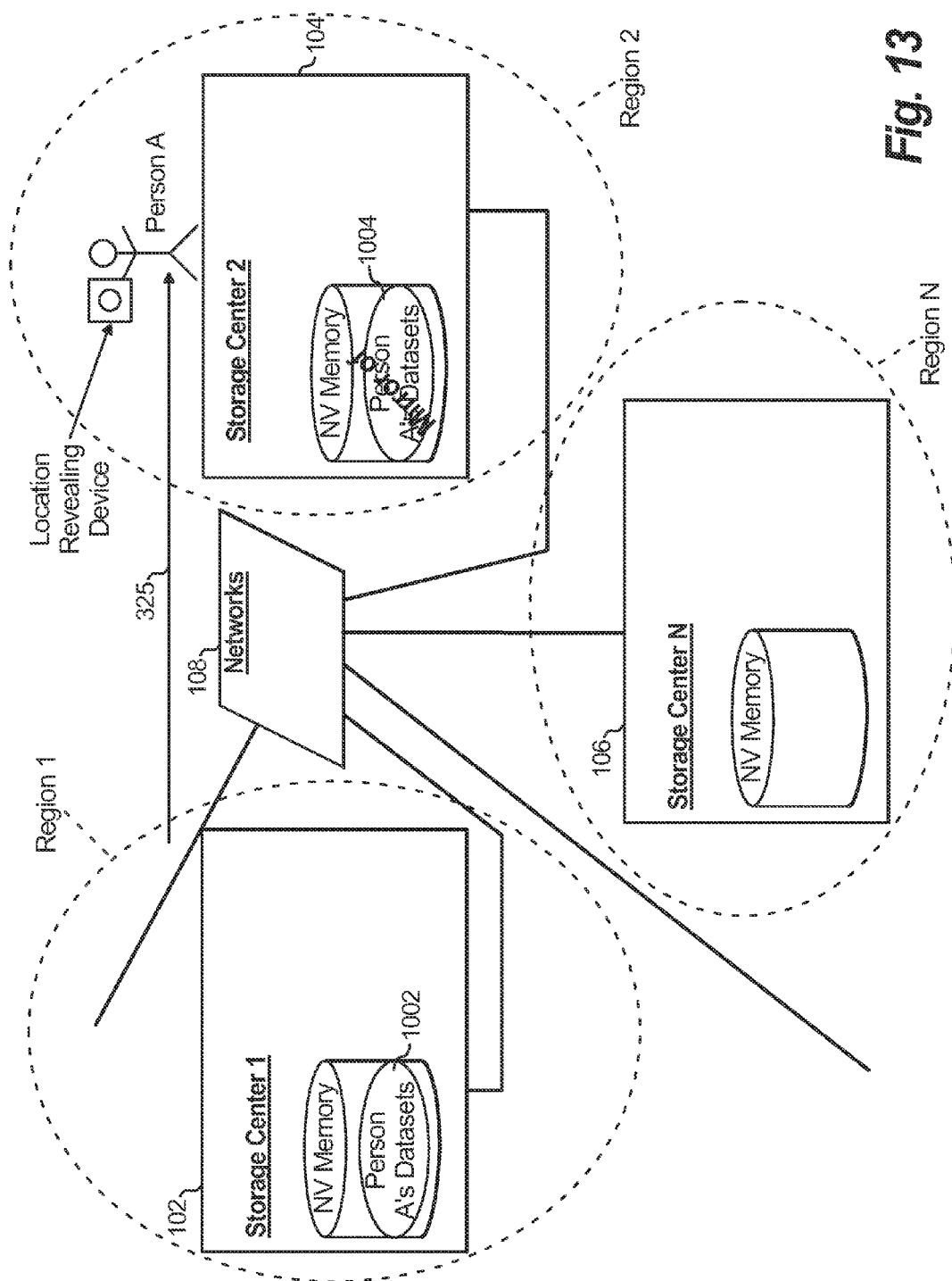
FIGS. 13 and 14 are conceptual views depicting at least a portion of an exemplary global storage system illustrating exemplary dataset migration scenarios with data mirrors, according to alternative embodiments of the invention.
Figure 14:
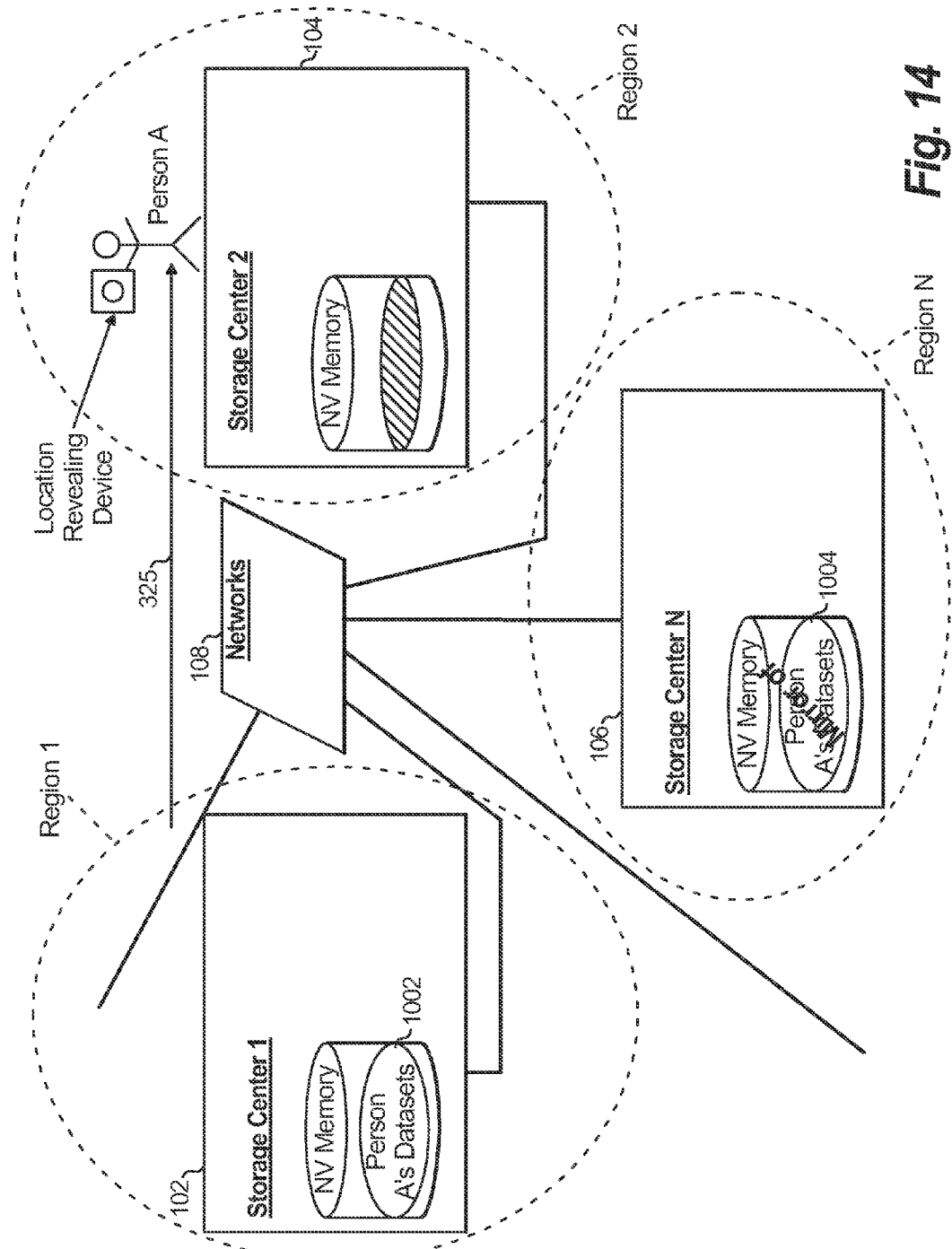
Figure 15:
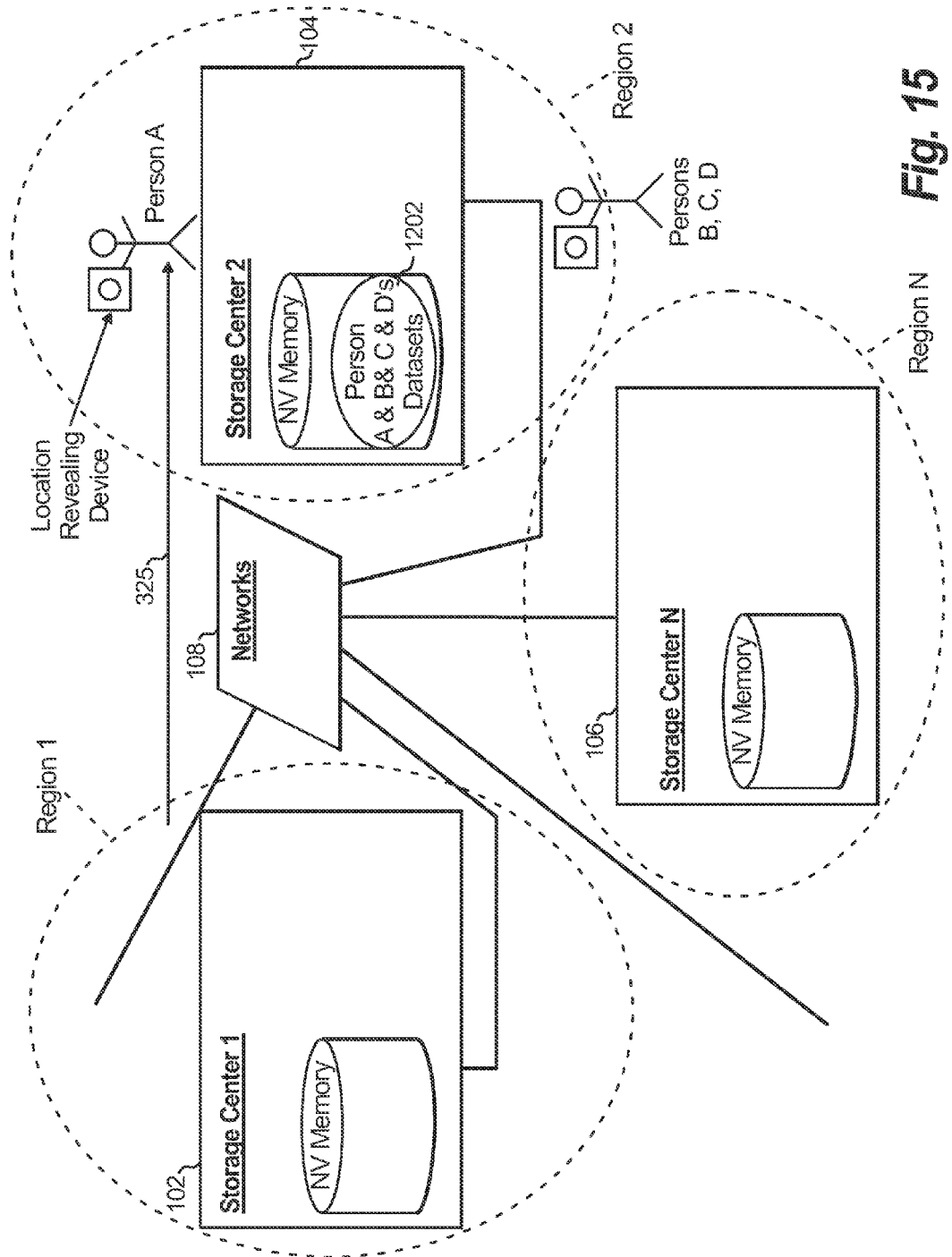
FIGS. 15 and 16 are conceptual views depicting at least a portion of an exemplary global storage system illustrating exemplary dataset migration scenarios with multiple users, according to alternative embodiments of the invention.
Figure 16:
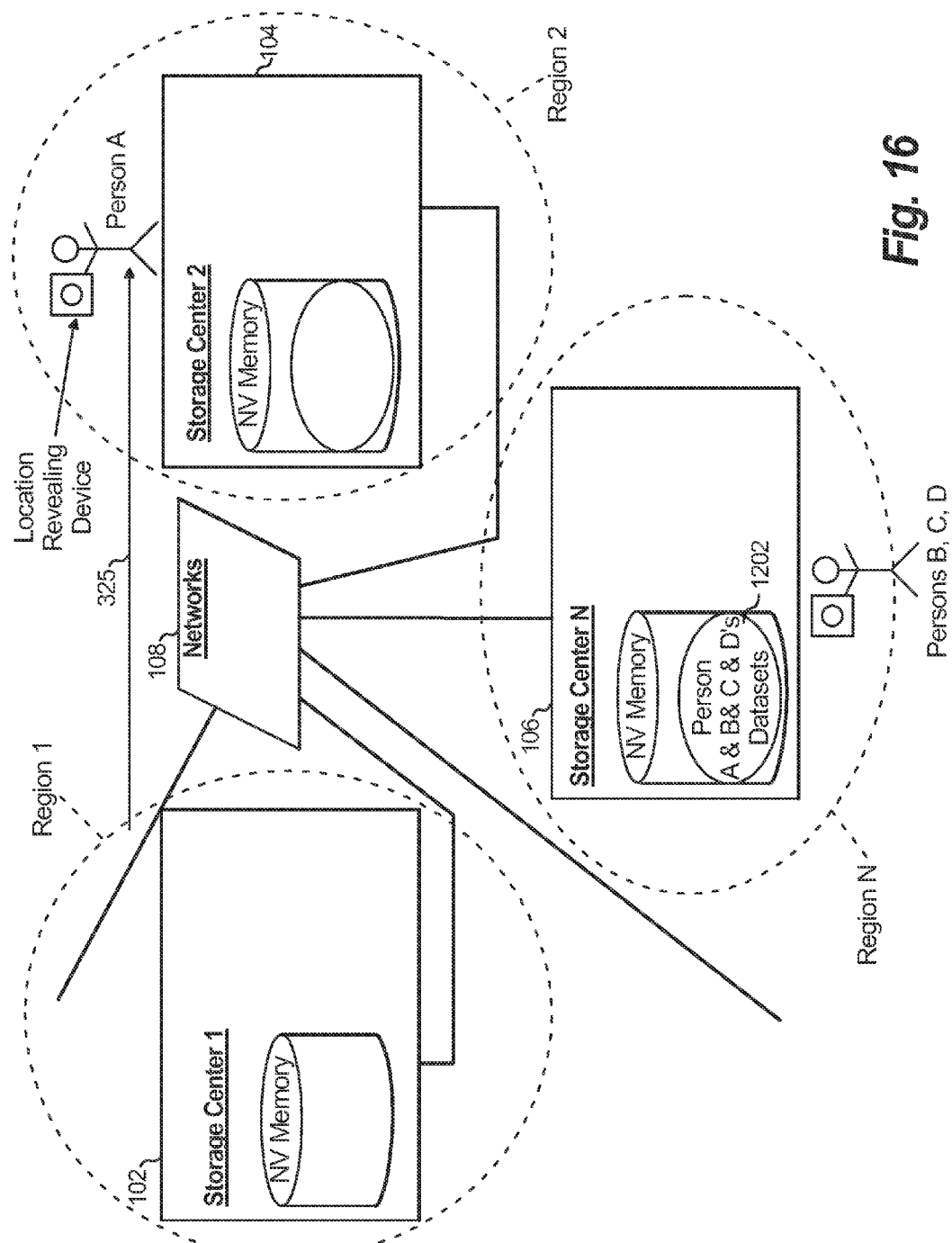

With regard to geographical movements of end users and/or entities, one illustrative scenario (Case 2) which associates a more permanent physical movement of an entity or person to its or his/her datasets, respectively, was previously described in conjunction with FIG. 6. It is to be appreciated, however, that various alternative scenarios involving the physical movement of end users and/or entities relative to their dataset are similarly contemplated by embodiments of the invention, some of which will be briefly described in conjunction with FIGS. 13-16. FIGS. 13 and 14 describe data mirrors, where a dataset and a copy (i.e., duplicate) of the dataset exist at two different storage centers for the purpose of disaster recovery (e.g., a storage center goes offline or is otherwise inaccessible), among other applications. While the figures show this for Case 2, similar use of data mirrors can be made for Case 1. FIGS. 15 and 16 emphasize placement decisions associated with a plurality of end users and/or entities. All of the illustrative scenarios depicted in FIGS. 13-16, which involve exemplary movements of one or more mobile persons or entities from one region to another, are alternatives of Case 2. All extraneous information has been removed from FIGS. 13-16 to emphasize the movement of the one or more mobile persons or entities and the movement of their associated datasets.

For each scenario, the movement from a first region (Region 1) to a second region (Region 2) is intended to be illustrative, and, hence, it represents the movement from any one region to any other region. More generally, the five illustrative scenarios (the first scenario having been previously described in connection with FIG. 6, or for Case 1 by FIG. 4) conceptually depict situations that are analogous to the movement of demand (where the movement of one or more persons represents a shift in the demand of one or more DREs, and thus a shift in center of gravity), essentially hidden from sight within Case 1 (FIG. 4). Hence, while the exemplary scenarios shown in FIGS. 13-16 involve the physical movement of a person or entity, these scenarios should be more broadly interpreted to also represent the fluctuations in dataset demand arising from individual requests of fixed and mobile DREs in the global storage system.

The scenario of FIG. 13 represents the movement of a person (A) from Region 1, which encloses regional storage center 102 in which person A's dataset 1002 is stored, to Region 2, which encloses regional storage center 104 in which a mirror (i.e., copy) of person A's dataset 1004 is stored. As indicated by arrow 325, person A has moved permanently from Region 1 to Region 2. In this scenario, since a "mirror" of person A's dataset already exists in the regional storage center 104 associated with Region 2, the dataset does not need to be migrated. However, a change of address needs to be made for person A. This permanent change of address is disseminated by the global residential location disseminator 513 and propagates ultimately (1) to storage address redirection modules and (2) to the metadata tables (e.g., Table 1) for the dataset (located now in storage center 2) and its copy (located now in storage center 1). Action (1) permits person A to obtain the dataset locally with region 2. Action (2) involves changes to the metadata tables' attributes that include (a) residence of the mobile user or entity and (b) data mirror. These modifications permit future dataset relocations to be handled properly.

The illustrative scenario of FIG. 14 represents the movement of person A away from Region 1, which encloses regional storage center 102 in which person A's dataset 1002 is stored. A mirror of person A's dataset 1004 is stored in the regional storage center 106 enclosed by Region N. In this scenario, person A has moved permanently from Region 1 to Region 2, as indicated by arrow 325. Since neither person A's dataset 1002 nor a mirror of person A's dataset 1004 is stored in the regional storage center 104 enclosed by Region 2, person A's dataset, or a copy thereof, must be migrated to the regional storage center 104 in Region 2. However, unlike scenario A shown in FIG. 6, a choice exists as to which regional storage center, storage center 102 or storage center 106, person A's dataset (or dataset mirror) should be migrated from. The closest of the two regional storage centers 102, 106 to storage center 104 is preferred, as determined not merely in terms of geographical distance, but in terms of other optimization factors, such as, but limited to, one or more of shortest network path, minimum power consumption, etc. In the above expressions involving locations, data mirrors mean that there are several alternative locations from where the migration of the dataset itself can be performed. For example, we may now be looking for a location L' of an existing data mirror and a new location L^ such that $a_1 \cdot d(l_1, L\hat{}) + \ldots + a_n \cdot d(l_n, L\hat{}) + b \cdot d(L', L\hat{}) \leq a_1 \cdot d(l_1, L) + \ldots + a_n \cdot d(l_n, L) + b \cdot d(L'', L)$ for every other possible location L (as defined before) and every location L" of an existing data mirror.

The scenarios of FIGS. 15 and 16, respectively, illustrate cases in which a dataset(s) is shared by more than one person or entity, such as persons A, B, C and D. In such scenarios, it would be advantageous to migrate a dataset used by persons A, B, C and D to a regional storage center that minimizes an average or total distance, or optimize an alternative characteristic, of requests from all persons to the shared dataset. Moreover, the dataset placement and/or assignment preferably tends toward the location of the person (or persons) whose use of the dataset is (are) greatest.

In the exemplary scenario of FIG. 15, since all persons A, B, C and D requesting a shared dataset 1202 are enclosed by the same region, Region 2, which encloses regional storage center 104 in which the shared dataset 1202 is stored, there is no need to migrate the dataset. In scenario of FIG. 16, however, person A resides in Region 2, which encloses regional storage center 104, and persons B, C and D reside in Region N, which encloses regional storage center 106 in which the shared dataset 1202 is stored. In this case, the shared dataset 1202 preferably resides in the regional storage center 106 closest to the greatest number of requesting persons or entities.

Scenarios of FIGS. 13 and 14 provide a conceptual understanding of one way in which data mirrors are treated within the global storage system, according to an embodiment of the invention. FIGS. 15 and 16 have been provided, at least in part, for the purpose of visualizing formulae already described.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "block," or "system." Furthermore, aspects of the present invention may take the form of a computer program product, the computer program product in turn comprising a tangible computer readable storage medium storing in a non-transitory manner executable program instructions which, when executed, implement method steps according to an embodiment of the invention.

One or more embodiments of the invention, or elements thereof, can be implemented in the form of apparatus including memory and at least one processor that is coupled to the memory and operative to perform exemplary method steps.

Figure 17:
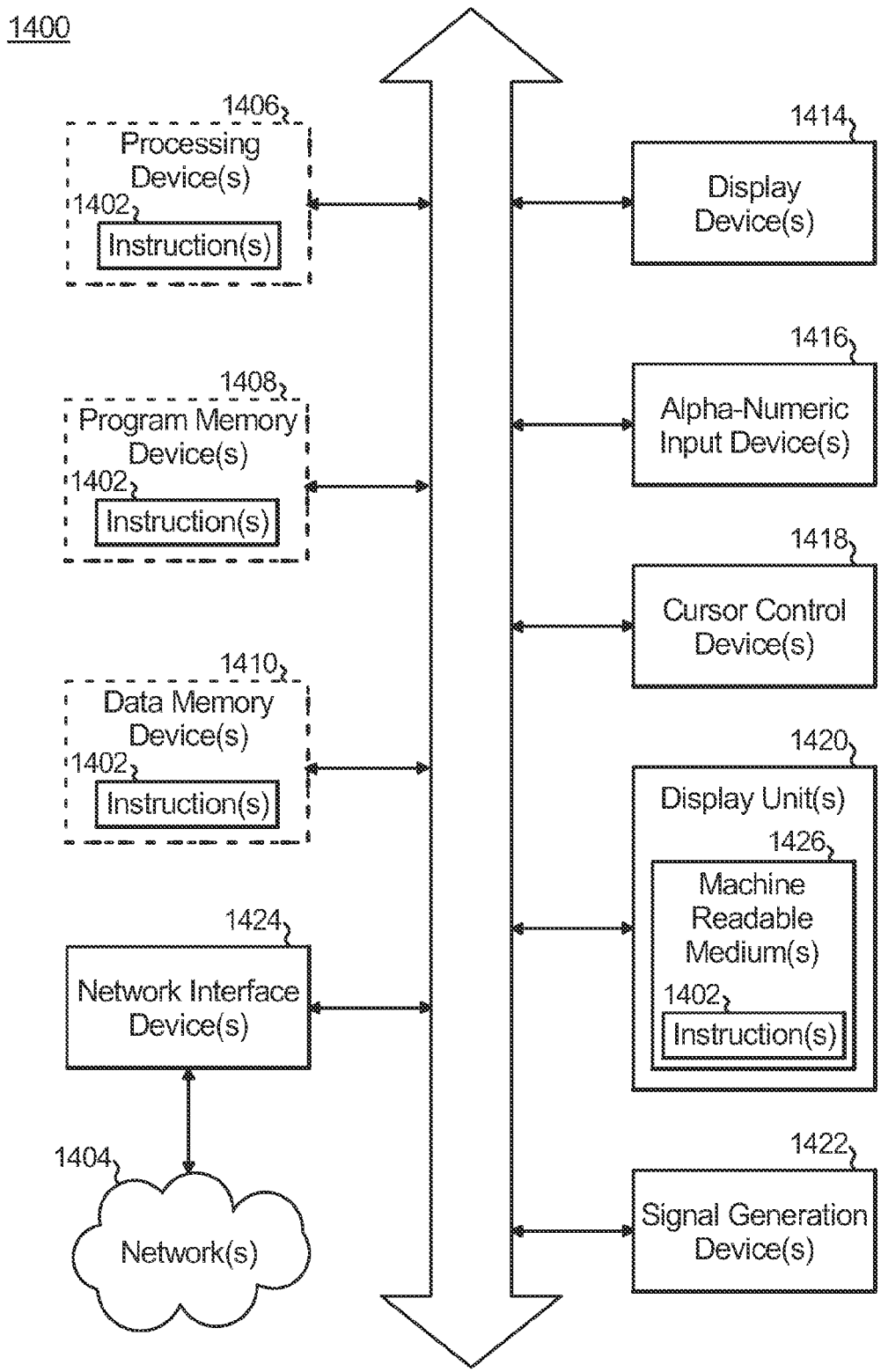
FIG. 17 is a block diagram depicting at least a portion of an exemplary data processing system in which embodiments of the invention are implemented.

FIG. 17 is a block diagram of an embodiment of a machine in the form of a computing system 1400, within which is a set of instructions 1402 that, when executed, cause the machine to perform any one or more of the methodologies according to embodiments of the invention. In some embodiments, the machine operates as a standalone device. In some embodiments, the machine is connected (e.g., via a network 1404, or networks 108 in FIGS. 4, 6, 9, and 13-16) to other machines. In a networked implementation, the machine operates in the capacity of a server or a client-user machine in a server-client user network environment. Exemplary implementations of the machine as contemplated herein include, but are not limited to, a server computer, client-user computer, personal computer (PC), tablet PC, network server, personal digital assistant (PDA), mobile device, palmtop computer, laptop computer, desktop computer, communication device, personal trusted device, web appliance, or any machine capable of executing a set of instructions (sequential or otherwise) that specify actions to be taken by that machine.

The computing system 1400 includes a processing device(s) 1406 (e.g., a central processing unit (CPU), a graphics processing unit (GPU), or both), program memory device(s) 1408, and data memory device(s) 1410, which communicate with each other via a bus 1412. The computing system 1400 further includes display device(s) 1414 (e.g., liquid crystal display (LCD), flat panel, solid state display, or cathode ray tube (CRT)). The computing system 1400 includes input device(s) 1416 (e.g., a keyboard), cursor control device(s) 1418 (e.g., a mouse), disk drive unit(s) 1420, signal generation device(s) 1422 (e.g., a speaker or remote control), and network interface device(s) 1424, operatively coupled together, and/or with other functional blocks, via bus 1412.

The disk drive unit(s) 1420 includes machine-readable medium(s) 1426, on which is stored one or more sets of instructions 1402 (e.g., software) embodying any one or more of the methodologies or functions herein, including those methods illustrated herein. The instructions 1402 also reside, completely or at least partially, within the program memory device(s) 1408, the data memory device(s) 1410, and/or the processing device(s) 1406 during execution thereof by the computing system 1400. The program memory device(s) 1408 and the processing device(s) 1406 also constitute machine-readable media. Dedicated hardware implementations, such as but not limited to application specific integrated circuits, programmable logic arrays, and other hardware devices are configured to implement the methods described herein. Applications that include the apparatus and systems of various embodiments broadly comprise a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments, the methods, functions, or logic described herein are implemented as one or more software programs running on a computer processor. Dedicated hardware implementations including, but not limited to, application specific integrated circuits (ASICs), programmable logic arrays (PLAs) and other hardware devices are configured to implement the methods described herein. Further, alternative software implementations including, but not limited to, distributed processing or component/object distributed processing, parallel processing, or virtual machine processing are configured to implement the methods, functions, or logic described herein.

The embodiment contemplates a machine-readable medium or computer-readable medium containing instructions 1402, or that which receives and executes instructions 1402 from a propagated signal so that a device connected to a network 1404 can send or receive voice, video or data, and to communicate over the network 1404 using the instructions 1402. The instructions 1402 are further transmitted or received over the network 1404 via the network interface device(s) 1424. The machine-readable medium also contains a data structure for storing data useful in providing a functional relationship between the data and a machine or computer in an illustrative embodiment of the systems and methods herein.

While the machine-readable medium 1402 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

It should also be noted that software, which implements the methods, functions or logic herein, are optionally stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

The illustrations of embodiments of the invention described herein are intended to provide a general understanding of the structure of the various embodiments, and they are not intended to serve as a complete description of all the elements and features of apparatus and systems that might make use of the structures described herein. Many other embodiments will become apparent to those of skill in the art upon reviewing the above description. Other embodiments are utilized and derived therefrom, such that structural and logical substitutions and changes are made without departing from the scope of this disclosure. Figures are also merely representational and are not necessarily drawn to scale. Certain proportions thereof may be exaggerated, while others diminished in order to facilitate an explanation of the embodiments of the invention. Accordingly, the specification and drawings are to be regarded in an illustrative rather than a restrictive sense.

Such embodiments of the inventive subject matter are referred to herein, individually and/or collectively, by the term "embodiment" merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus the following claims are hereby incorporated into the Detailed Description, with each claim standing on its own as a separate example embodiment.

The Abstract is provided to comply with 37 C.F.R. §1.72 (b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings of the invention provided herein, one of ordinary skill in the art will be able to contemplate other implementations and applications of the techniques of the invention. Although illustrative embodiments of the invention have been described herein with reference to the accompanying drawings, it is to be understood that the invention is not limited to those precise embodiments, and that various other changes and modifications are made therein by one skilled in the art without departing from the scope of the appended claims.

What is claimed is:

1. An apparatus for controlling a storage of data among a plurality of regional storage centers operatively coupled through a network in a global storage system, the apparatus comprising:
    memory; and
    at least one processor connected with the memory, the at least one processor being configured: (i) to define at least one dataset comprising at least a subset of the data stored in the global storage system; (ii) to define at least one ruleset for determining where to store the at least one dataset; (iii) to track at least one attribute relating to at least one data requesting entity operating in the global storage system, the at least one data requesting entity requesting the at least one dataset; and (iv) to determine, as a function of said at least one ruleset and said at least one attribute relating to the at least one data requesting entity, information regarding a location for storing the at least one dataset among the plurality of regional storage centers having available resources that reduces at least one of total distance traversed by the at least one dataset in serving the at least one data requesting entity and latency of delivery of the at least one dataset to the at least one data requesting entity;
    wherein the at least one processor is further configured to determine whether a migration of the at least one dataset is worthwhile, and, when it is determined that migration is not worthwhile, continue to obtain information regarding the demand for the at least one dataset; wherein determining whether a migration of the at least one dataset is worthwhile comprises determining a new location, $L\hat{}$, for the dataset, among the plurality of regional storage centers having available resources, which satisfies an expression $a_1 \cdot d(l_1, L\hat{}) + \ldots + a_n \cdot d(l_n, L\hat{}) + b \cdot d(L', L\hat{}) \leq a_1 \cdot d(l_1, L) + \ldots + a_n \cdot d(l_n, L) + b \cdot d(L', L)$ for every other possible location L of the plurality of regional storage centers, where $d(l_j, l_k)$ is a network distance function indicative of a distance between any two locations $l_j$ and $l_k$, $a_1, \ldots, a_n$ represent amounts of data of respective data transfers, $l_1, \ldots, l_n$ represent locations from where usage of the at least one dataset occurs, b represents a size of the at least one dataset, and L' represents a location of a given one of the plurality of regional storage centers in which the at least one dataset resides prior to migration of the dataset.

2. The apparatus of claim 1, wherein in determining whether a migration of the at least one dataset is worthwhile, the at least one processor is further configured to determine whether a physical location of the at least one of the one or more data requesting entities is permanent.

3. The apparatus of claim 1, wherein the at least one processor is further configured to migrate the at least one dataset to the location determined to reduce the total distance traversed by the dataset, among the plurality of regional storage centers having available resources, in serving the at least one of the one or more data requesting entities when it is determined that migration is worthwhile.

4. The apparatus of claim 1, further comprising at least one address redirection module, the address redirection module configured to at least one of transform and route a request for the at least one dataset to a corresponding one of the plurality of regional storage centers in which at least one of the at least one dataset and a copy of the at least one dataset is stored.

5. The apparatus of claim 1, wherein said at least one attribute relating to at least one data requesting entity comprises geographical location of the at least one data requesting entity.

6. A non-transitory machine-accessible storage medium for controlling a storing of data among a plurality of regional storage centers operatively coupled through a network in a global storage system, the storage medium comprising:
    computer readable program code configured to define at least one dataset comprising at least a subset of the data stored in the global storage system;
    computer readable program code configured to define at least one ruleset for determining where to store the at least one dataset;
    computer readable program code configured to obtain information regarding a demand for the at least one dataset through one or more data requesting entities operating in the global storage system; and
    computer readable program code configured to determine, as a function of the at least one ruleset, information regarding a location for storing the at least one dataset among a plurality of regional storage centers having available resources that reduces at least one of (i) total distance traversed by the at least one dataset in serving at least one of the one or more data requesting entities and (ii) latency of delivery of the at least one dataset to the at least one of the one or more data requesting entities;
    wherein the storage medium further comprises computer readable program code configured to determine whether a migration of the at least one dataset is worthwhile, and, when it is determined that migration is not worthwhile, to continue to obtain information regarding the demand for the at least one dataset; wherein determining whether a migration of the at least one dataset is worthwhile comprises determining a new location, $L\hat{}$, for the dataset, among the plurality of regional storage centers having available resources, which satisfies an expression $a_1 \cdot d(l_1, L\hat{}) + \ldots + a_n \cdot d(l_n, L\hat{}) + b \cdot d(L', L\hat{}) \leq a_1 \cdot d(l_1, L) + \ldots + a_n \cdot d(l_n, L) + b \cdot d(L', L)$ for every other possible location L of the plurality of regional storage centers, where $d(l_j, l_k)$ is a network distance function indicative of a distance between any two locations $l_j$ and $l_k$, $a_1, \ldots, a_n$ represent amounts of data of respective data transfers, $l_1, \ldots l_n$ represent locations from where usage of the at least one dataset occurs, b represents a size of the at least one dataset, and L' represents a location of a given one of the plurality of regional storage centers in which the at least one dataset resides prior to migration of the dataset.

7. The storage medium of claim 6, wherein in determining whether a migration of the at least one dataset is worthwhile, the storage medium further comprises computer readable program code configured to determine whether a physical location of the at least one of the one or more data requesting entities is permanent.

8. The storage medium of claim 6, wherein the storage medium further comprises computer readable program code configured to migrate the at least one dataset to the location determined to reduce the total distance traversed by the dataset, among the plurality of regional storage centers having available resources, in serving the at least one of the one or more data requesting entities when it is determined that migration is worthwhile.

9. The storage medium of claim 6, wherein the storage medium further comprises computer readable program code configured to at least one of transform and route a request for the at least one dataset to a corresponding one of the plurality of regional storage centers in which at least one of the at least one dataset and a copy of the at least one dataset is stored.

10. The storage medium of claim 6, wherein said at least one attribute relating to at least one data requesting entity comprises geographical location of the at least one data requesting entity.

* * * * *